(12) United States Patent
Qiu et al.

(10) Patent No.: US 7,276,877 B2
(45) Date of Patent: Oct. 2, 2007

(54) SENSORLESS CONTROL METHOD AND APPARATUS FOR A MOTOR DRIVE SYSTEM

(75) Inventors: Ming Qiu, Toronto (CA); Hassan A. Kojori, Mississauga (CA); Bin Wu, Toronto (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/846,274

(22) Filed: May 14, 2004

(65) Prior Publication Data

US 2005/0007044 A1 Jan. 13, 2005

Related U.S. Application Data

(60) Provisional application No. 60/485,732, filed on Jul. 10, 2003.

(51) Int. Cl.
*H02P 6/18* (2006.01)
(52) U.S. Cl. .................. 318/721; 318/721; 318/632; 318/636; 318/700; 318/798; 318/453
(58) Field of Classification Search ............... 318/700
See application file for complete search history.

(56) References Cited

U.S. PATENT DOCUMENTS

| | | | | |
|---|---|---|---|---|
| 5,991,525 A * | 11/1999 | Shah et al. | .................. | 703/2 |
| 6,005,364 A * | 12/1999 | Acarnley | .................. | 318/632 |
| 6,202,033 B1 * | 3/2001 | Lange | .................. | 702/104 |
| 6,285,971 B1 * | 9/2001 | Shah et al. | .................. | 703/2 |
| 6,407,531 B1 * | 6/2002 | Walters et al. | .............. | 318/805 |
| 6,492,788 B1 * | 12/2002 | Agirman et al. | ............ | 318/700 |
| 6,564,110 B1 * | 5/2003 | Makino et al. | .............. | 700/56 |
| 6,566,840 B1 * | 5/2003 | Wu et al. | .................. | 318/727 |
| 6,763,622 B2 * | 7/2004 | Schulz et al. | .............. | 318/700 |

(Continued)

OTHER PUBLICATIONS

Silverio Bolognani, Roberto Oboe, and Mauro Zigliotto, Sensorless Full-Digital PMSM Drive with EKF estimation of speed and rotor position; Feb. 1, 1999, IEEE Transactions on Industrial Electronics. vol. 46. No. 1. pp. 184-191.*

(Continued)

*Primary Examiner*—Lincoln Donovan
*Assistant Examiner*—Robert W. Horn
(74) *Attorney, Agent, or Firm*—Birch, Stewart, Kolasch & Birch, LLP

(57) ABSTRACT

A method and apparatus provide a state observer control system 600 for a motor 106 that uses an extended Kalman filter 330 to predict initial rotor position and afterwards accurately predict rotor position and/or speed under variable types of loading conditions. A control system model 300 is generated that allows variable setting of an initial rotor position to generate estimated rotor position and speed as outputs. The control system model 300 includes an EKF (extended Kalman filter) estimator 330, speed controller 322, a current controller 324, and a variable load component 310. During operation, EKF estimator 330 estimates rotor speed 327 and position 333 based on reference voltages 402, 404 and currents 1325 generated by speed and current controllers 322, 324 and input from frame transformers 326, 328. Additionally, the reference currents and voltages 402, 404, 1325 are frame-transformed to be used as feedback signals 418, 346 in the system 600 and as drive signals to control power to be applied to a motor load 602.

14 Claims, 22 Drawing Sheets

U.S. PATENT DOCUMENTS

| | | | |
|---|---|---|---|
| 6,788,024 B2* | 9/2004 | Kaneko et al. | 318/807 |
| 6,940,685 B2* | 9/2005 | Chrappan Soldavini et al. | 360/78.06 |
| 2002/0089301 A1* | 7/2002 | Slater et al. | 318/701 |
| 2003/0057912 A1* | 3/2003 | Iwaji et al. | 318/700 |
| 2003/0193310 A1* | 10/2003 | Raftari et al. | 318/798 |
| 2004/0061461 A1* | 4/2004 | Tajima et al. | 318/254 |
| 2004/0108826 A1* | 6/2004 | Green | 318/254 |
| 2004/0134267 A1* | 7/2004 | Boesch et al. | 73/118.1 |
| 2005/0024009 A1* | 2/2005 | Kinpara et al. | 318/700 |
| 2007/0057842 A1* | 3/2007 | Coleman et al. | 342/359 |

OTHER PUBLICATIONS

Bolognani, S., et al., "Sensorless full digital PMSM drive with EKF estimation of speed and rotor position," IEEE Transactions on Industrial Electronics, vol. 46, Feb. 1999, pp. 184-191.

Boussak, M., Sensorless speed control and initial rotor position estimation of an interior permanent magnet synchronous motor drive, IECON 02, 28th Annual Conference of the Industrial Electronics Society, vol. 1, Nov. 2002, pp. 662-667.

Hu, Jun, et al., "Permanent magnet synchronous motor drive without mechanical sensors," Canadian Conference on Electrical and Computer Engineering, vol. 2, May 1996, pp. 603-606.

Kalman, R.E., "A New Approach to Linear Filtering and Prediction Problems," Transactions of the ASME-Journal of Basic Engineering, 82 (Series D):35-45, 1960.

Welch, Greg, et al., "An Introduction to the Kalman Filter," TR95-041 Department of Computer Science, University of North Carolina at Chapel Hill, Chapel Hill, NC 27599-3175, Apr. 5, 2004.

Salvatore, L., et al., "Application of EKF to parameter and state estimation of pmsm drive," Electric Power Applications, IEEE Proceedings-B, vol. 139, No. 3, May 1992, pp. 155-164.

Dhaouadi, R., et al., "Design and Implementation of an Extended Kalman Filter for the State Estimation of a Permanent Magnet Synchronous Motor," IEEE Transactions on Power Electronics, vol. 6, No. 3, Jul. 1991, pp. 491-497.

Bolognani, S., et al., "DSP-based Extended Kalman Filter Estimation of Speed and Rotor Position of a PM Synchronous Motor," IECON 94, 20th International Conference on Industrial Electronics, Control and Instrumentation, vol. 3, Sep. 5-9, 1994, pp. 2097-2102.

Bolognani, S., et al., Extended-Range PMSM Sensorless Speed Drive Based on Stochastic Filtering, IEEE Transactions on Power Electronics, vol. 16, No. 1, Jan. 2001, pp. 110-117.

Shi, K.L., et al., "High-Performance Sensorless PMSM Drive with Extended Kalman Filter," 2002 SAE Power Systems Conference, Oct. 2002, Florida Texas Instruments, "Sensorless Control with Kalman Filter on TMS320 Fixed-Point DSP," Literature No. BPRA057, Texas Instruments Europe, Jul. 1997.

* cited by examiner

SENSORLESS CONTROL METHOD AND APPARATUS FOR A MOTOR DRIVE SYSTEM

CROSS-REFERENCE TO RELATED APPLICATIONS

This application claims priority from U.S. Provisional Patent Application No. 60/485,732, entitled "EXTENDED KALMAN FILTER (EKF) METHOD AND APPARATUS FOR SENSORLESS CONTROL OF MONITOR DRIVE SYSTEMS" filed Jul. 10, 2003, the entire disclosure of which is herein incorporated by reference for all purposes.

FIELD OF THE INVENTION

The present invention relates to predictive control systems for various loads, and more particularly to a robust, sensorless predictive method and apparatus for accurately detecting rotor speed and position in a synchronous motor generator system.

BACKGROUND OF THE INVENTION

An important component of a controlled motor-drive system is an electro-mechanical machine. Depending on the application, such machines can be used either as a generator or a motor through the interaction of their "stator magnetic field" and their "rotor magnetic field", to convert mechanical energy to electrical energy, or vice versa, as is well known in the field of controlled motor-drive systems. Generally at least four distinct types of machines can be identified, based on how the stator and rotor magnetic fields are produced and interacted with each other. These types include a Permanent Magnet Synchronous Machine (PMSM), wherein a rotating magnetic field is generated by the application of a three phase balanced AC voltage to the stator. Permanent magnets may be used in the rotor, to establish the rotor magnetic field. Another further type includes a Brushless DC Machine (BLDC), similar to the PMSM, except that instead of exciting all the three stator windings, only two windings of the stator windings may be excited at the same time, which results in trapezoidal as opposed to sinusoidal currents for windings. Another further type includes a Wound-Rotor Synchronous Machine (WRSM), wherein a rotating magnetic field is generated by the application of a three-phase balanced AC voltage to the stator, similar to the PMSM. Though for the WRSM, the rotor magnetic filed may be produced by passing a DC current in a distributed winding in the rotor. This current can be transferred to the rotor field winding through "slip-rings and brushes", or through a brushless method. And another further type includes an Induction Machine (IM), wherein the stator may be excited in the same way as the PMSM, but the rotor magnetic field is established by induction from the stator field at a different frequency as compared to the stator, and is thus called an asynchronous machine.

For these types of motor drive systems described above, a commonly utilized control system, used in aerospace and industrial applications, includes a closed-loop arrangement to measure the speed and/or position of a motor (e.g., permanent magnet synchronous motor—PMSM), particularly the PMSM rotor speed and/or position. FIG. 1 illustrates a prior art closed-loop control system 100 for measuring the rotor speed/position of a PMSM 106. The closed-loop system 100 includes DC power supply 102, inverter 104 which is powered by supply 102, pulse width modulating signal (PWMS) generator 110, shaft sensor 108, speed controller 116, frame transformation devices 112, 114. During conventional operation, the system 100 uses speed controller 116 to generate a current reference 122 from the difference between a speed reference 117 and the measured speed 120 output from sensor 108 (e.g., hall sensor). Two projected components ($I^*_d$ and $I^*_q$), on d and q axes, respectively, of the reference current 122 are compared to dq components, output from frame transformer 114, of measured three phase components ($I_a$, $I_b$, $I_c$) from inverter 104. The measured error between the dq components and the projected components produces the control variables $V_d$ and $V_q$ which are input to frame transformer 112, along with the measured rotor position 121 output from sensor 108, to produce dq-to-abc components $V_a$, $V_b$, $V_c$ which are three-phase voltage reference values. These references values are input to PWM generator 110 to produce PWM signals for inverter 104 to produce output voltages from the three-phase inverter 104 to drive PMSM 106.

This technique shown in FIG. 1, however, increases system complexity and decreases system reliability. The PMSM 106 must have the sensor 108 built in or attached mechanically to the rotor, and interfaces and wiring must be added for control (excitation) and feedback signals (e.g., $V_a$, $V_b$, $V_c$, $I_a$, $I_b$, $I_c$) between the controller 116 and the sensor 108. Also, PMSM 106 may be located at a distance from controller 116 creating the need for unwanted extra wiring in the system.

To avoid the wiring and other disadvantages of a sensor control system, sensorless motor control techniques may be used to increase system reliability and eliminate the need for extra wiring in the system. In addition, these techniques eliminate the need for a discrete position sensor and also reduce the system cost. A sensorless motor control technique may be a more flexible/adaptable solution for a motor drive system than one that relies on a separate position sensor. It may be particularly valuable for an aircraft system where increased reliability and reduction of weight (e.g., through elimination of the sensor and additional wiring) are extremely important.

For linear systems, a Kalman filter may be used to determine the states and outputs of a system as shown in FIG. 19 which shows the structure of a Kalman filter 1900. For filter 1900, we may assume a system with the following equations:

$$\dot{x} = A \cdot x + B \cdot u + \sigma, \qquad (1)$$

$$y = H \cdot x + \rho. \qquad (2)$$

where $\sigma$ and $\rho$ are the system and the measurement noises, which are stationary, white, uncorrelated and Gauss noises, and the expectations are zeros. Further, the covariance matrices of these noises may be defined as:

$$Q = E[\sigma \cdot \sigma^T], \qquad (3)$$

$$R = E[\rho \cdot \rho^T]. \qquad (4)$$

where E[ ] denotes expected values.

The system equation of Kalman filter 1900 becomes:

$$\hat{x} = (A - K \cdot H) \cdot \hat{x} + B \cdot u + K \cdot y \qquad (5).$$

Matrix K may be set based on the covariance of the noises. A measure of the goodness of the observation may be established as:

$$J = E[e^T \cdot e]. \qquad (6)$$

where e follows:

$$e = x - \hat{x}. \quad (7)$$

Advantageously, K may be chosen to make J minimal where the solution is the following $$K = P \cdot H^T \cdot R^{-1}. \quad (8)$$

where P can be calculated from the solution of the following Riccati equation:

$$P \cdot H^T \cdot R^{-1} \cdot H \cdot P - A \cdot P - P \cdot A^T - Q = 0. \quad (9)$$

Q and R may be set up based on the stochastic properties of the corresponding noises.

However, the Kalman filter 1900 is only useful for linear systems which necessitates the generation of an Extended Kalman Filter (estimator) as described herein particularly suited for non-linear systems which may be encountered for motor-drive systems.

A conventional sensorless control system may be used to measure PMSM rotor speed and/or position (a non-linear system) as illustrated by prior art control system 200 shown in FIG. 2. Control system 200 includes similar components from system 100 in FIG. 1 except that speed and position outputs 203, 205 are estimated by speed and position estimator 109 instead of measured by sensor 108. As shown in FIG. 2, estimator 109 receives as input three-phase current components $I_a$, $I_b$, $I_c$ generated by inverter 104 and receives as input three-phase voltage components $V_a$, $V_b$, $V_c$ voltages from frame transformer 1112. Estimator 109 may use a two current loop system to correct for an initial, estimated rotor position, and to correct and update flux-linkage produced in the PMSM which generates sufficient torque in the system 200 such that PMSM may be used as a starter and/or generator. Also, estimator may estimate the motor line current from the input current components, calculate the error between the current estimate and the measured current, and use the error calculation to determine the speed and position of the rotor for a particular time interval. Subsequently, the process may be repeated for future time intervals to correct flux-linkage and predict rotor position. Advantageously, this process may be used for both brushless DC motors (BLDCM) and PMSMs, but control system performance may degrade based on the quality and accuracy of flux-linkage estimates and measurements of system voltages and currents. Additionally, control system accuracy may degrade from system harmonics and noise, machine parameter variations due to temperature changes and magnetic saturation.

Other prior art sensorless methods utilize a state observer technique but these methods are susceptible to motor drive system parameter variation and require complex non-linear control theory, which make these other methods difficult to fine-tune and implement. Such methods also suffer from additional limitations including lack of any accurate information on the initial rotor position which is further complicated by initial speed/position convergence problems, and the need for injecting a current pulse at the start-up of the motor to avoid a stall condition. Lack of proper operation of such methods has prevented their accuracy and effectiveness over the full speed and torque range, required by dynamic loads, which is a main reason for sensorless control of drive systems not becoming wide-spread.

Therefore, due to the disadvantages of current sensorless control systems for motor-drive systems, there is a need to provide a state observer control method that overcomes these limitations and provides a robust, easily implemented, sensorless control apparatus for a motor-drive system.

SUMMARY OF THE INVENTION

The system of the present invention overcomes the previously mentioned problems by providing a predictive, state observer control system for a motor that uses an Extended Kalman Filter (EKF) to first estimate the initial rotor position, and then accurately predict rotor position and/or speed in quasi real-time for a variety of dynamic load conditions during operation without using a speed/position sensor. The EKF-based model described herein for an entire integrated motor-drive system includes power electronics and associated digital controls circuitry for the system and performs fast calculations for ease of digital signal processing and controls implementation. The overall motor-drive control system model includes an EKF (extended Kalman filter) estimator, speed controller, a current controller, a DC-AC power conversion inverter module, a Pulse Width Modulated (PWM) gating pattern generator, and a variable speed/torque load component. During operation, EKF estimator module estimates rotor speed, rotor position, and current states based on reference voltages and currents generated by speed and current controllers input from frame transformers. Also, the obtained, accurate sensorless position estimations are used to achieve frame-transformed reference currents and reference voltages which are used as feedback signals in the system and as drive signals to control power to be applied to a PMSM load.

BRIEF DESCRIPTION OF THE DRAWINGS

Other aspects of the present invention will become apparent from the following description taken in conjunction with the accompanying drawings, in which.

DETAILED DESCRIPTION

Embodiments of the present invention are more specifically set forth in the following description, with reference to the appended drawings. In the following description and accompanying drawings like elements are denoted with similar reference numbers. Further, well-known elements and related explanations are omitted so as not to obscure the inventive concepts presented herein.

U.S. patent application Ser. No. 10/244,496 ("the '496 application"), filed Sep. 16, 2002 and titled "Position Sensor Emulator for a Synchronous Motor/Generator," which discloses embodiments for deriving rotor position information from phase voltage signals output by main generator stator windings (stator phase windings) of a synchronous motor generator, is incorporated herein by reference.

Figure 1:
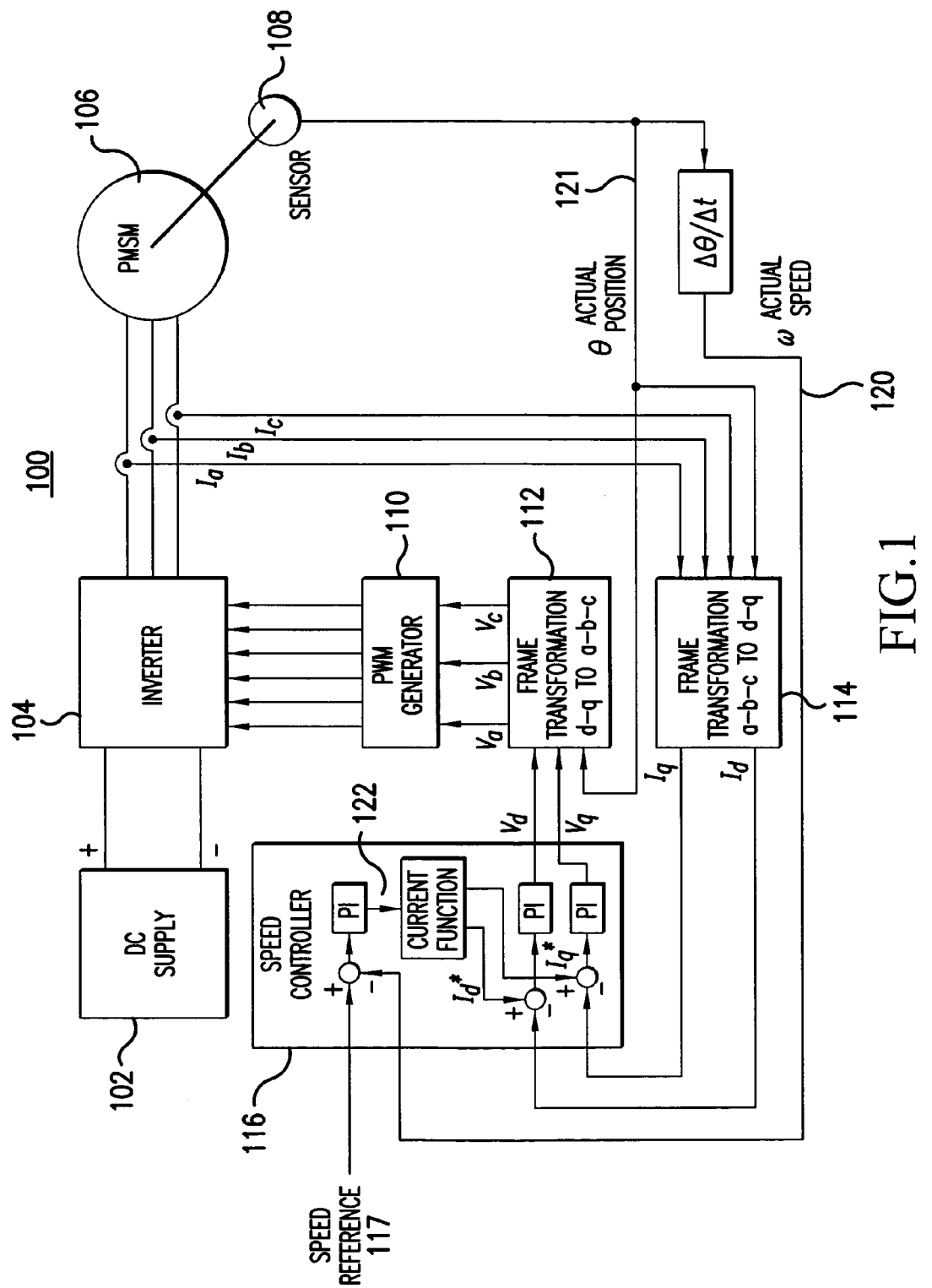
FIG. 1 is a general block diagram of a conventional motor generator system using a position sensor to determine rotor position for motor generator control.
Figure 2:
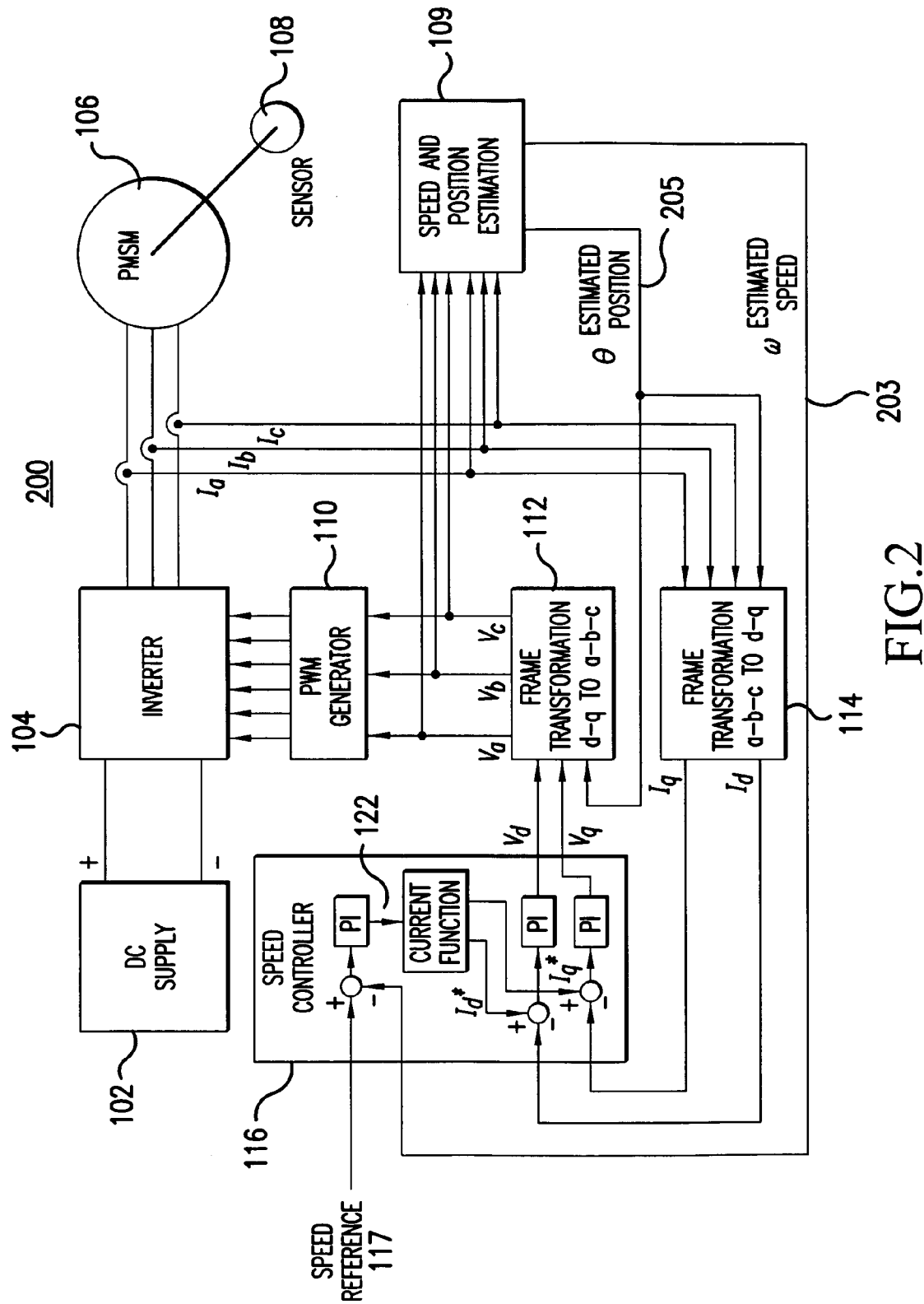
FIG. 2 is a general block diagram of a conventional sensorless motor generator system.
Figure 12:
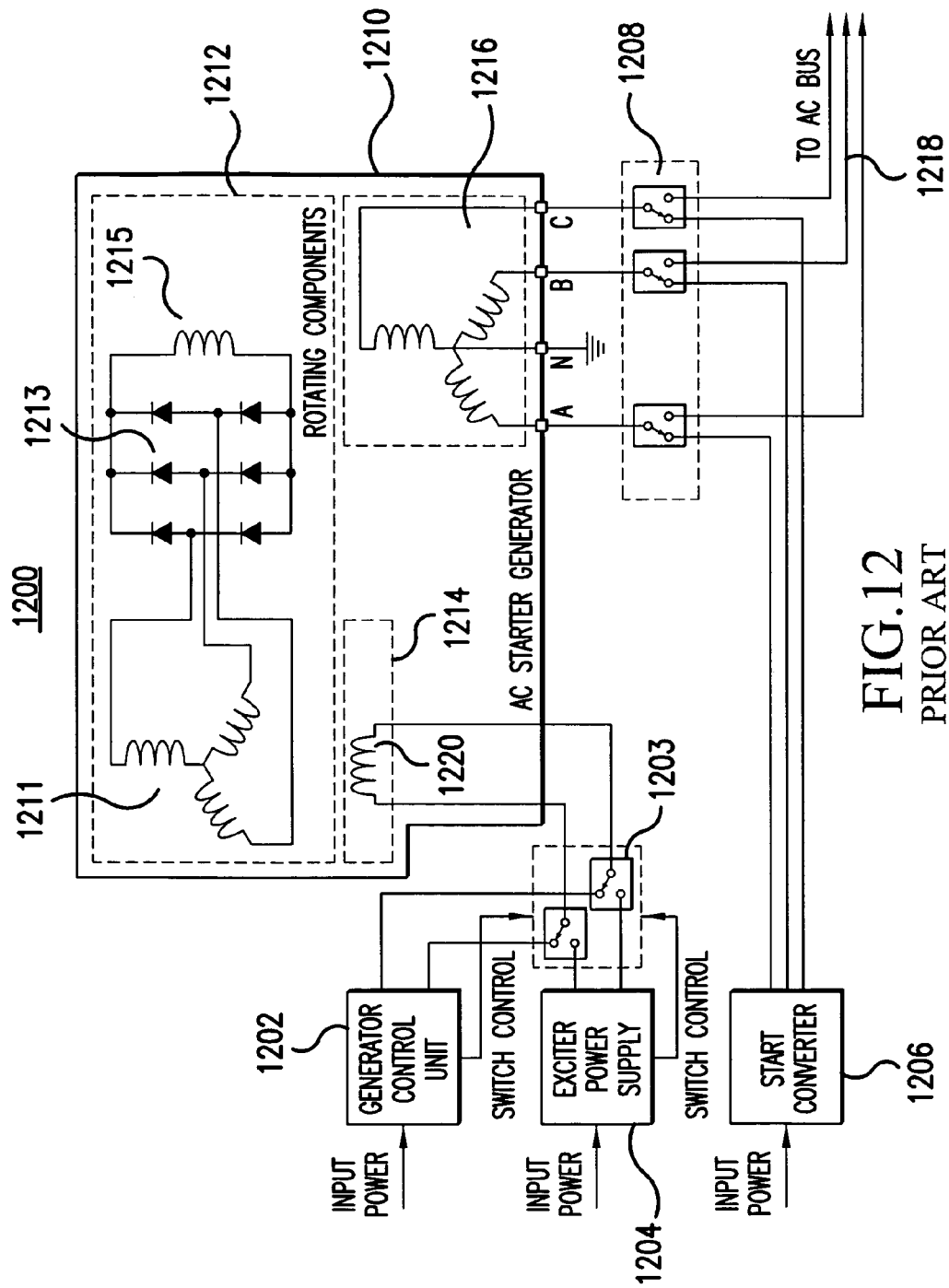
FIG. 12 illustrates a motor system to which the control system of FIG. 3 may be applied in accordance with embodiments of the present invention.

The motor drive systems 100, 200 of FIGS. 1, 2 previously described along with the motor drive system of 1200 shown in FIG. 12 illustrate motor generator systems to which principles of the present invention may be applied to derive rotor position, rotor speed, and current (observer) states of the discrete-time controlled system 100, 200, 1200 from signals output from stator phase windings. As illustrated in FIG. 12, the motor generator system 1200 includes the following main components: a brushless synchronous motor generator (BLSM) 1210; a generator control unit 1202; an exciter power supply 1204; and a start converter 1206. The motor generator system 1200 further includes motor generator switching units 1203, 1208, for switching between a generator mode and a motor (starter) mode for the synchronous motor generator 1210.

The synchronous motor generator 1210 includes a rotating unit 1212, including three-phase exciter windings 1211, a rectifier bridge 1213, and a main generator field winding 1215, mounted on a rotatable shaft, e.g., coupled to a gas turbine engine of an aircraft. The synchronous motor generator 1210 further includes stator components, including an exciter field winding 1220 and three-phase main generator windings 1216. The exciter field winding 1220 of the stator and the three-phase exciter windings 1211 of the rotor constitute an exciter generator and the field winding 1215 of the rotor 1212 and the three-phase windings 1216 of the stator constitute a main generator.

In generator mode, the motor generator switching units 1203, 1208, which may be for example well known switching elements, are positioned so the generator control unit 1202 is connected to supply DC current ("DC excitation") to the exciter field winding 1220 (via switch 1203) and the outputs, A, B, C, of the three-phase generator windings 1216 are connected to an AC bus 1218 (via switch 1208). In an exemplary embodiment, when DC excitation is supplied to DC winding 1220, rotation of the generator shaft (not shown) by the aircraft engine causes the generation of a polyphase voltage in the armature winding 1211 that is rectified by the rectifier assembly 1213 and coupled to the winding 1215. This rectified voltage sets up a DC field in the main rotor field winding 1215 which causes a rotating magnetic field in the main stator coil 1216 that produces output power with regulated voltage at a point of regulation (POR) 1208 (prior to the bus contact switch) for delivery to AC bus 1218 via terminals A, B, C, and switch 1208. The DC current flowing through the exciter field winding 1220 may be varied in amplitude to achieve the desired AC power on the AC bus 1218. In generate mode, rotor position information is not required by the system 1200.

Additionally, the system 1200 may use the starter/generator 1210 as a motor to start the aircraft engine. An external power source (exciter power supply—EXPS) 1204 is coupled to the generator 1210 using the exciter stator 1214. The coupled power from EXPS 1204 induces AC power through transformer effect in the polyphase winding 1211 of the rotor 1212 because no relative motion between rotor and stator exists at zero speed. The AC power established in winding 1211 may be rectified by rectifier assembly 1213 to generate DC power in the main field winding 1215. Additionally, a start converter 1206 is used to supply controlled AC power to main stator coil 1216 such that sufficient torque is produced by the starter/generator 1210. This torque is produced by the interaction between the flux in the main rotor winding 1215 and the current (flux) established in coil 1216. The frequency of the controlled AC power is increased from 0 Hz (0 RPM) to a predetermined frequency corresponding to the generated torque for starter/generator 1210 at the end of start. The phase of the current for the supplied AC power input is controlled as function of rotor position to develop the desired torque for starter/generator 1210. To create sufficient torque for efficiently moving the rotor via electromagnetic force, commutation of stator phase windings 1216 requires that the position of the rotor be known.

Figure 3A:
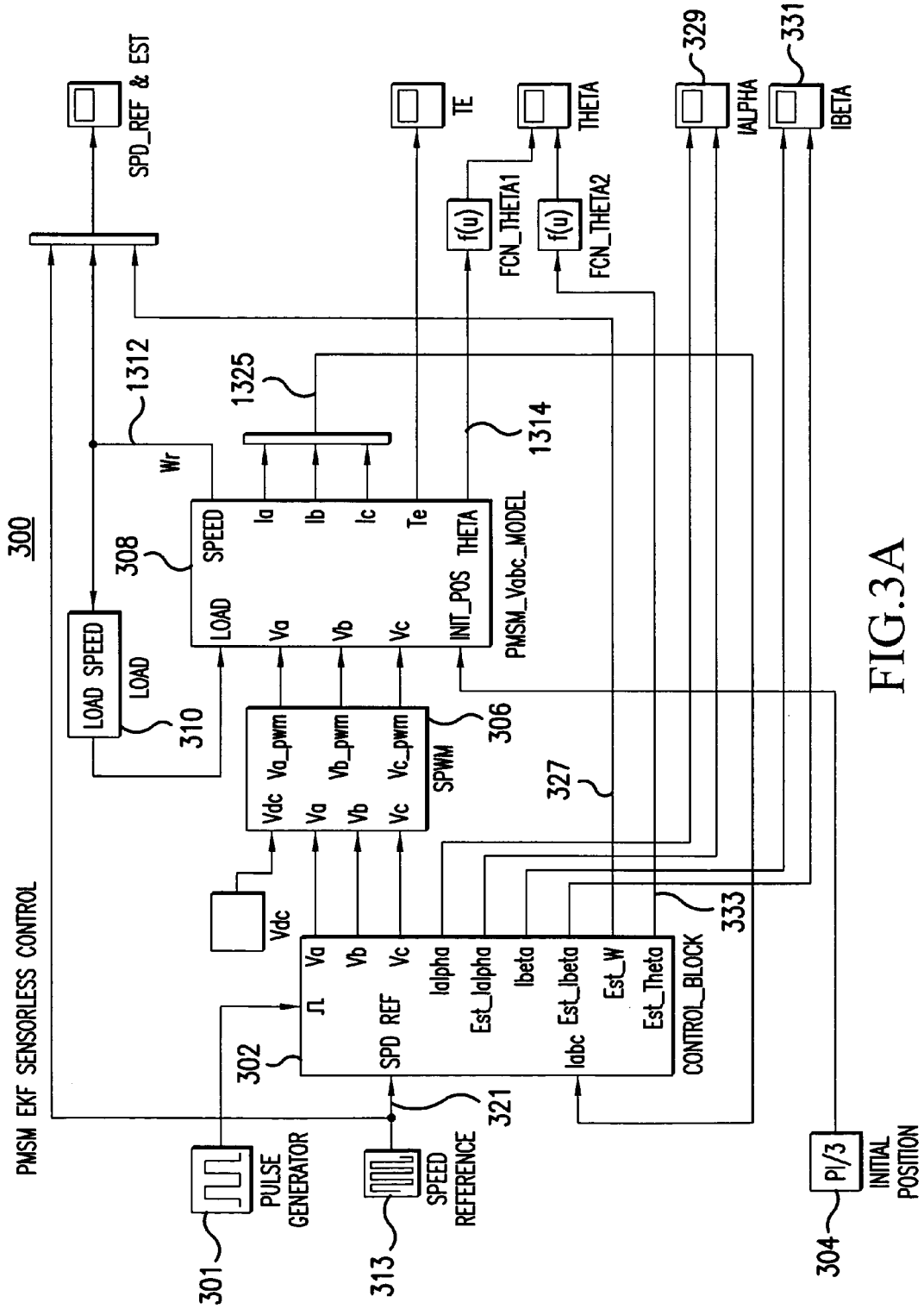
FIGS. 3a, b illustrate models of a sensorless motor control system and subsystem in accordance with embodiments of the present invention.
Figure 3B:
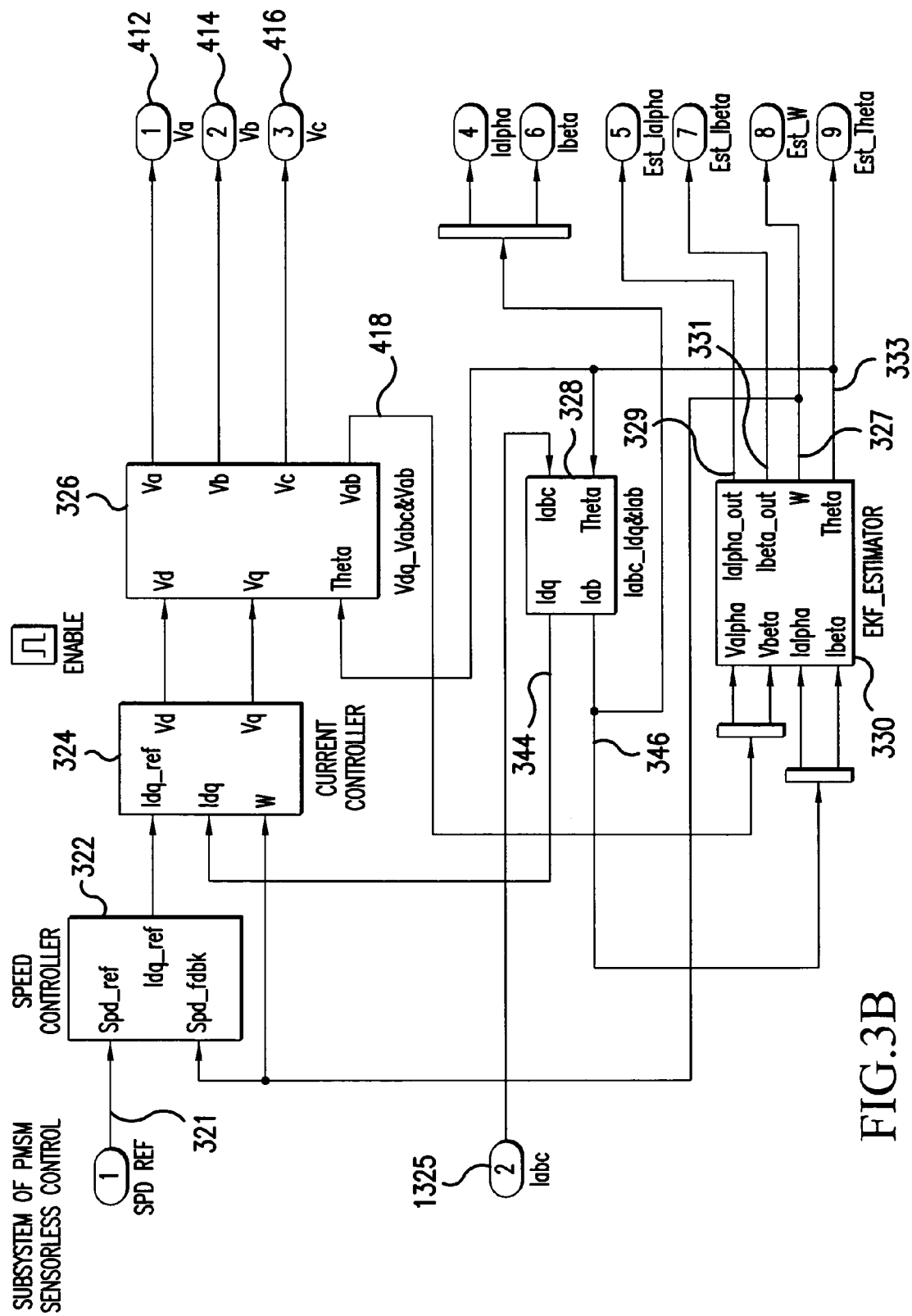

FIG. 3a illustrates a model of a sensorless motor control system 300 in accordance with embodiments of the present invention that may be used with motor system 1200. The system model 300 includes a control block 302, sinusoidal pulse width inverter (SPWM) 306, load 310, and PMSM motor model 308. FIG. 3b illustrates the subsystem for control block 302 which includes speed controller 322, current controller 324, voltage frame transformer 326, current frame transformer 328, and estimator 330 (extended kalman filter—EKF).

Figure 10A:
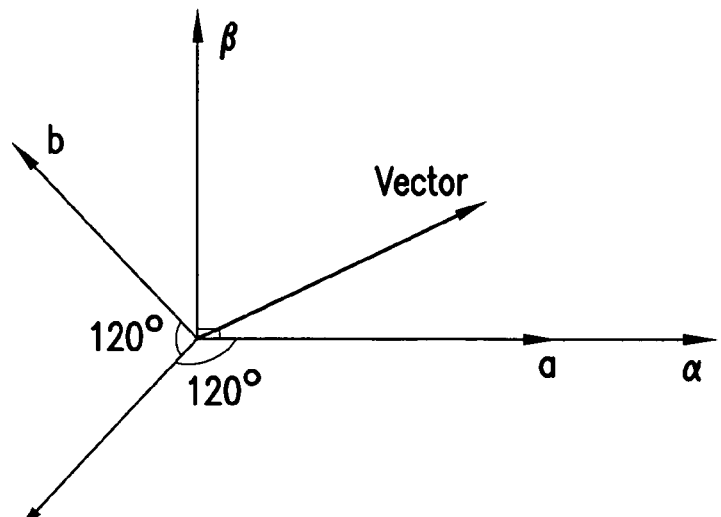
FIGS. 10a, 10b, 10c illustrate vectors in the stator (abc), stationary (αβ), and arbitrary (dq) reference frames in accordance with embodiments of the present invention.
Figure 10B:
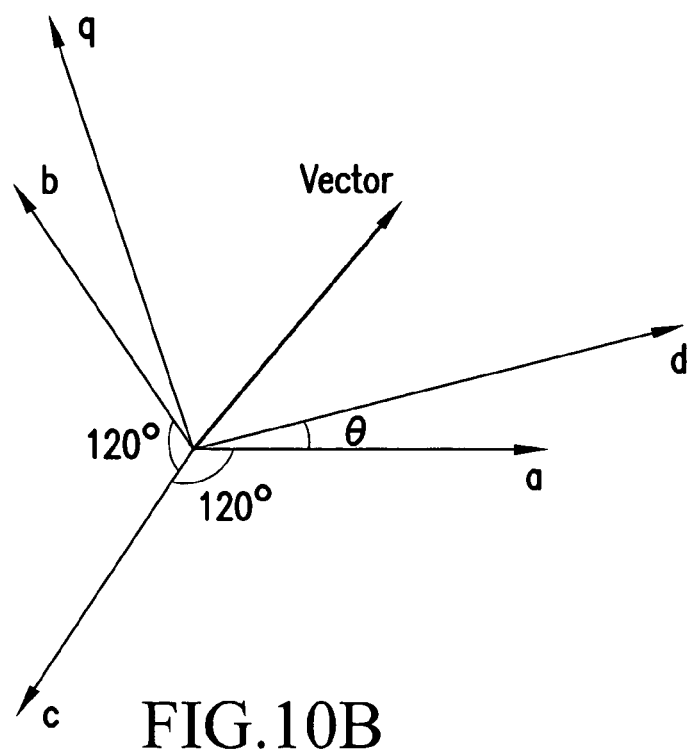
Figure 10C:
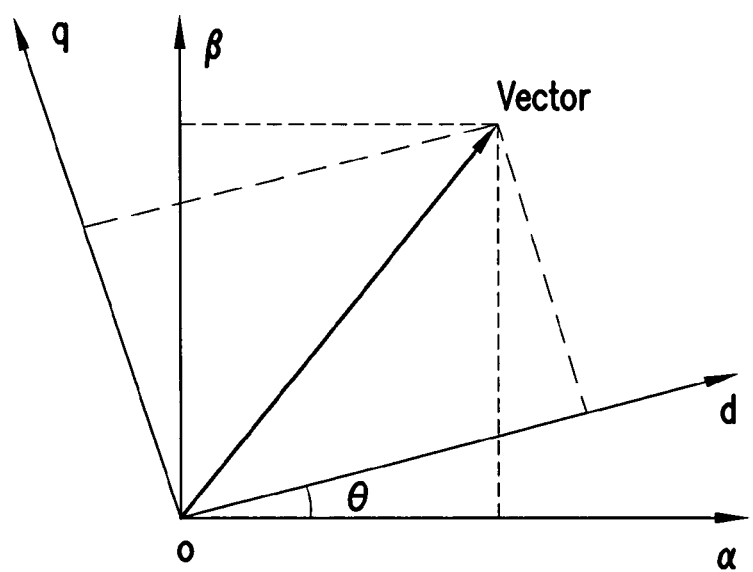
Figure 11:
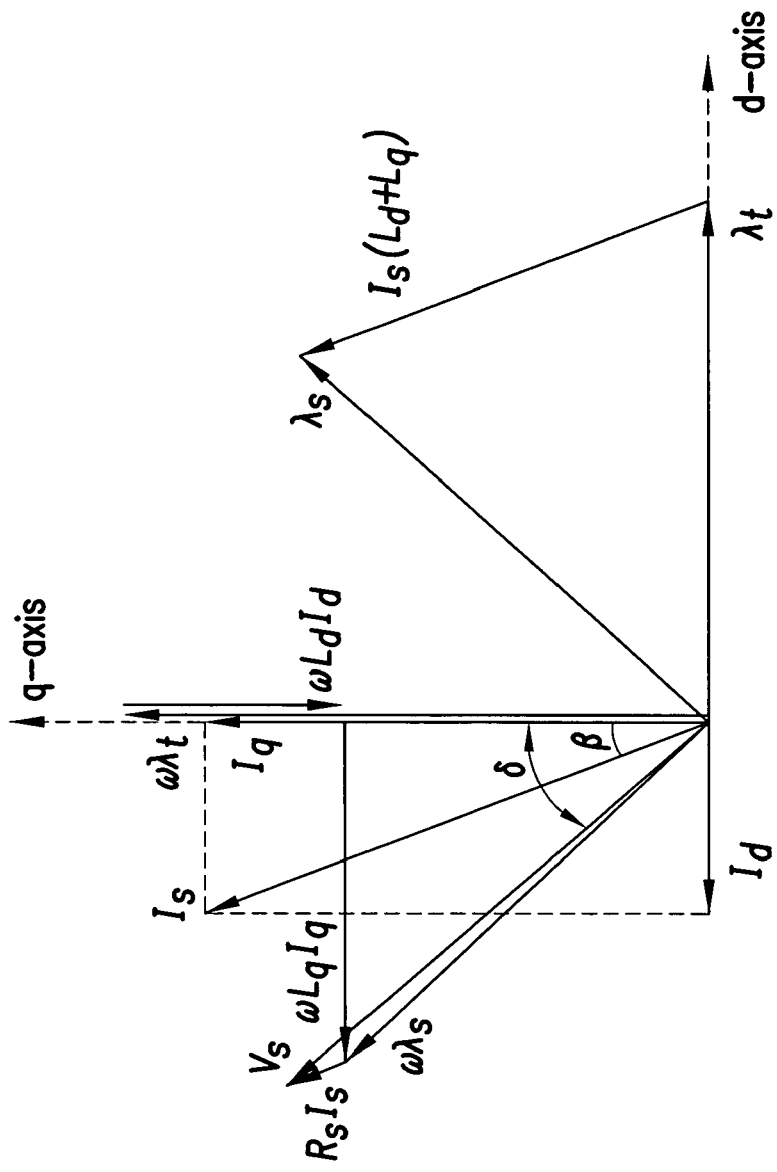
FIG. 11 illustrates the vector diagram of a motor in an arbitrary (dq) frame in accordance with embodiments of the present invention.

For a motor drive system such as system 1200, terminal variables of the motor, such as voltages and currents, are time-varying. For better control of the motor system 1200, standard frame transformations (e.g., abc-to-dq) of the motor electrical variables and parameters (e.g., voltages and currents) are used to convert the time-varying system into a time-invariant system to better utilize the EKF 330 for estimating rotor position, rotor speed, and observer states of the system. A vector can be described in a stator (abc) frame by three elements, in a stationary ($\alpha\beta$) frame by two elements, and in an arbitrary frame (dq) by two elements. In control system 300, variables in the stator (abc) frame are transformed into the 2-axis stationary or arbitrary frame to simplify the mathematical complexity and acquire useful control components ($V_{abc}$, $I_{abc}$) using frame transformers 326, 328 shown in FIG. 3b. Subsequently, the control components ($V_{abc}$, $I_{abc}$) are transformed back into three-phase variables of the stator frame to drive a PMSM motor model 308. FIGS. 10a, 10b, 10c illustrate vectors in the different reference frames (αβ, abc, dq) where vectors a, b, c have equal magnitude and are separated from each other by an angle of 120°. FIG. 11 illustrates a vector diagram of the model PMSM 308 in an arbitrary (dq) frame. Computations for the vectors in the diagram shown in FIG. 11, equations of the model PMSM 308 including in a dq reference frame, and transformation equations are well-known and disclosed in Qiu, "Extended Kalman Filter Application in Permanent Magnet Synchronous Motor Sensorless Control", Thesis Publication, Ryerson Univ., August 2003, which is hereby incorporated by reference.

Figure 13:
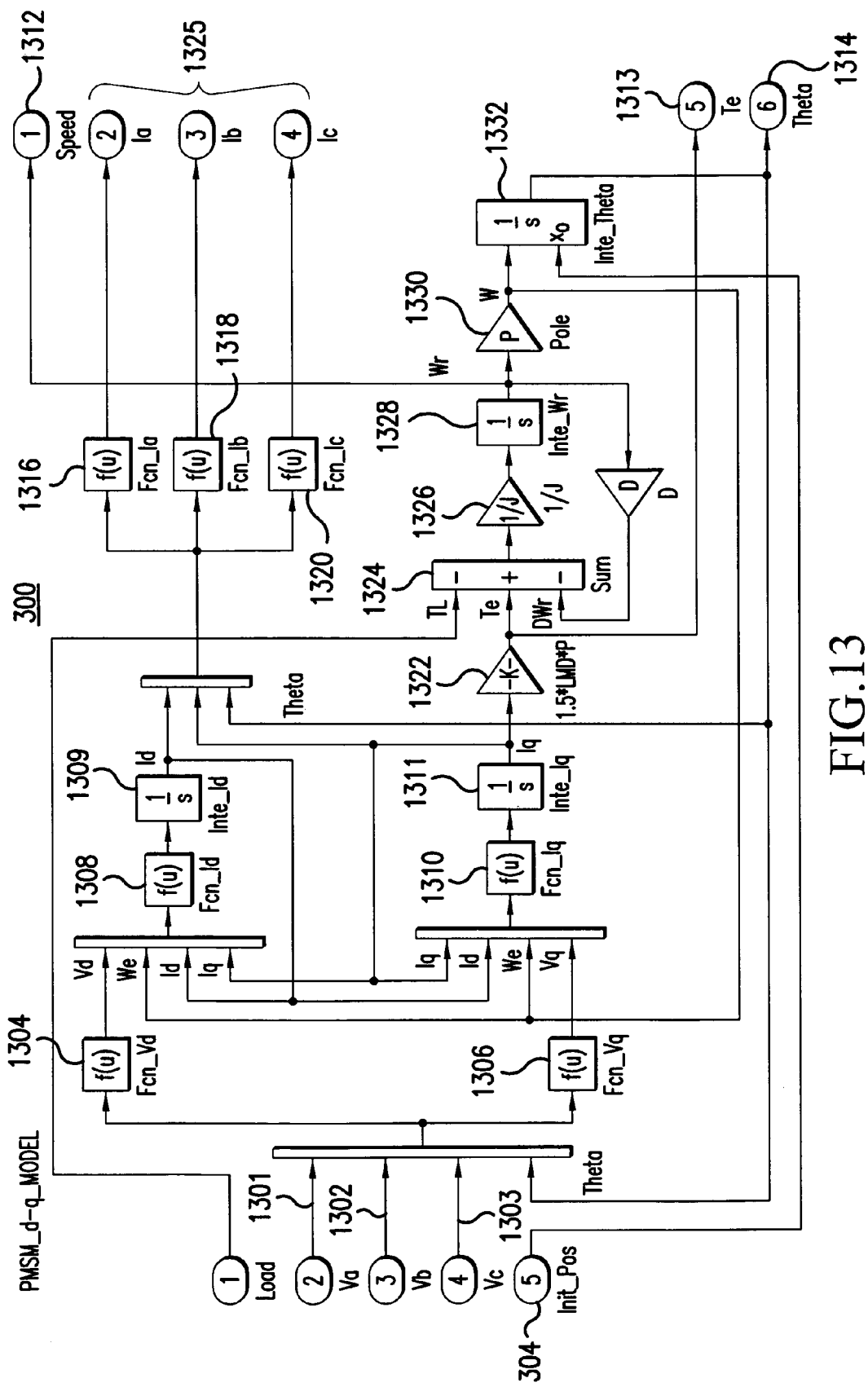
FIG. 13 illustrates a model of a synchronous motor system used in a sensorless motor control system in accordance with embodiments of the present invention.

During operation, system model 300 estimates rotor position, rotor speed, and observer (current) states for PMSM model 308 using estimator 330 to generate useful drive signals for SPWM 306 and motor model 308. As illustrated in FIGS. 12, 13, three-phase voltage output signals $V_a$, $V_b$, $V_c$ are generated from stator components 1220, 1216 and then may be input as signals 1301, 1302, 1303 to be frame transformed from the stator frame (represented by three elements) to the arbitrary frame (dq) using PMSM model 308 to generate measured rotor speed 1312 (ω) and position (theta or θ) 1314 outputs. These measured values 1312, 1314 for rotor speed and position may be later compared with estimates 327, 333 derived by estimator 330. Voltage transform blocks 1304, 1306 transform the three-phase voltage inputs 1301, 1302, 1303 ($V_a$, $V_b$, $V_c$) into $V_d$ and $V_q$ (dq reference frame voltages). Further, transform blocks 1308, 1309, 1310, 1311 calculate the current in the arbitrary frame (dq–$I_d$, $I_q$) to compute $I_d$, $I_q$. Then, transform blocks 1316, 1318, 1320 transform the arbitrary frame currents into the three-phase current outputs ($I_a$, $I_b$, $I_c$) 1325. Also, function blocks 1322, 1324, 1326, 1328, 1330, and 1332 compute the rotor position ($θ_e$) 1314. Further, the initial rotor position 304 (as shown in FIG. 3a) may be preset and input (e.g., 45 degrees–π/4) to help produce useful control outputs for the system and monitor the startup transient for system 1200. Particularly, the function blocks shown in FIG. 13 may compute the following functions: $2/3*(V_a*\cos(θ)+V_b*\cos(θ-2/3*π)+V_c*\cos(θ+2/3*π))$ for block 1304, $-2/3*(V_a*\sin(θ)+V_b*\sin(θ-2/3*π)+V_c*\sin(θ+2/3*π))$ for block 1306, $V_d/L+W_e*I_q-I_d*R_s/L$ for block 1308, $V_q/L-W_e*I_d-W_e*LMD/L-I_q*R_s/L$ for block 1310, $I_d*\cos(θ)-I_q*\sin(θ)$ for block 1316, $I_d*\cos(θ-2/3*π)-I_q*\sin(θ-2/3*π)$ for block 1318, $I_d*\cos(θ+2/3*π)-I_q*\sin(θ+2/3*π)$ for block 1320, and $1.5*LMD*N_p$ for block 1322. For these function blocks, L is the inductance (equivalent to the d-axis and q-axis inductance), $W_e$ is the stator electrical angular speed, $R_s$ is the resistance of the stator, LMD ($λ_r$—lamda) is the rotor flux linkage of the PMSM model 308, and $N_p$ is the number of pole pairs. Also, output $T_e$ 1313 may be computed as:

$$T_e = 3/2 * N_p * λ_r * I_q \tag{10}$$

Figure 14:
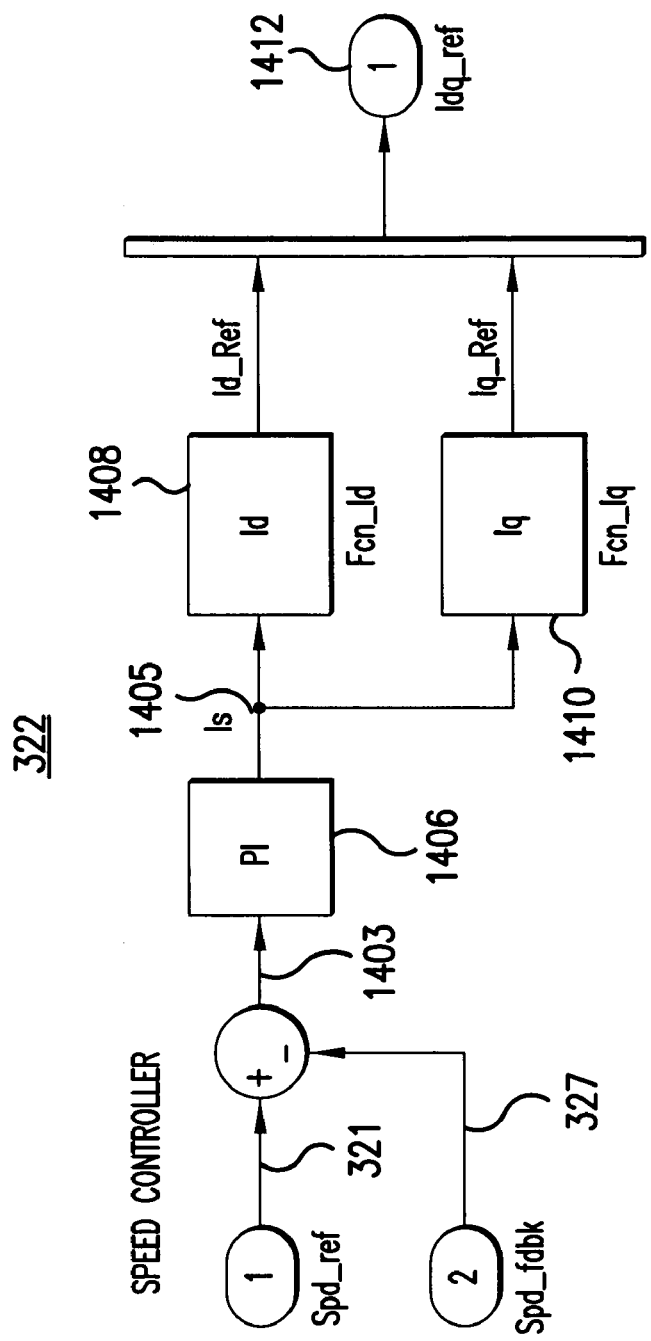
FIG. 14 illustrates a speed controller of a sensorless motor control system in accordance with embodiments of the present invention.
Figure 15:
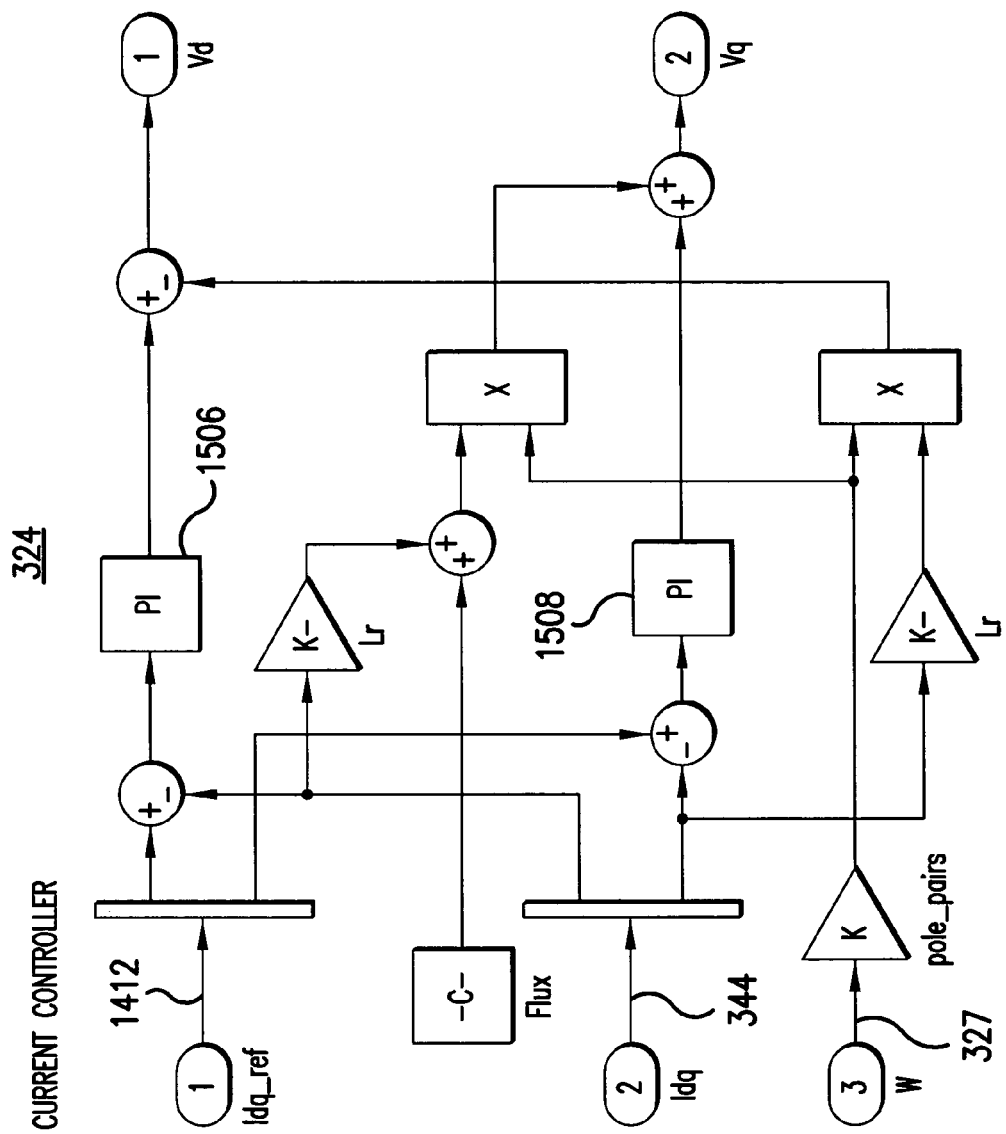
FIG. 15 illustrates a current controller of a sensorless motor control system in accordance with embodiments of the present invention.

FIGS. 14, 15 illustrate the details of the speed and current controller blocks 322, 324 in FIG. 3b. Speed controller 322 receives as inputs a speed feedback 327 from the estimator (EKF) 330 and a speed reference signal 321 which may be advantageously generated by a signal generator 313 (shown in FIG. 3a) which are compared to generate a speed error 1403. The speed error may be input to proportional integral (PI) 1406 to produce a current reference Is output 1405 that is fed to both d and q transform blocks 1408, 1410 to generate transformed current reference $I_{dq}$ output 1412. The functions computed by block 1408, 1410 are well-known in the art as disclosed by Morimoto et al. ("Current Phase Control Methods for Permanent Magnet Synchronous Motors"), IEEE Transactions on Power Electronics, Vol. 5, No. 2, April 1990, which is hereby incorporated by reference.

As shown in FIG. 15, $I_{dq}$ reference output 1412, current $I_q$ ($I_d$ set to zero), and rotor speed ($ω_e$) 327, output from estimator 330, are input to current controller 324. Current controller 324 uses PI blocks 1506, 1508 to generate voltage outputs in the arbitrary (dq) frame, $V_d$, $V_q$ from these inputs.

Figure 4:
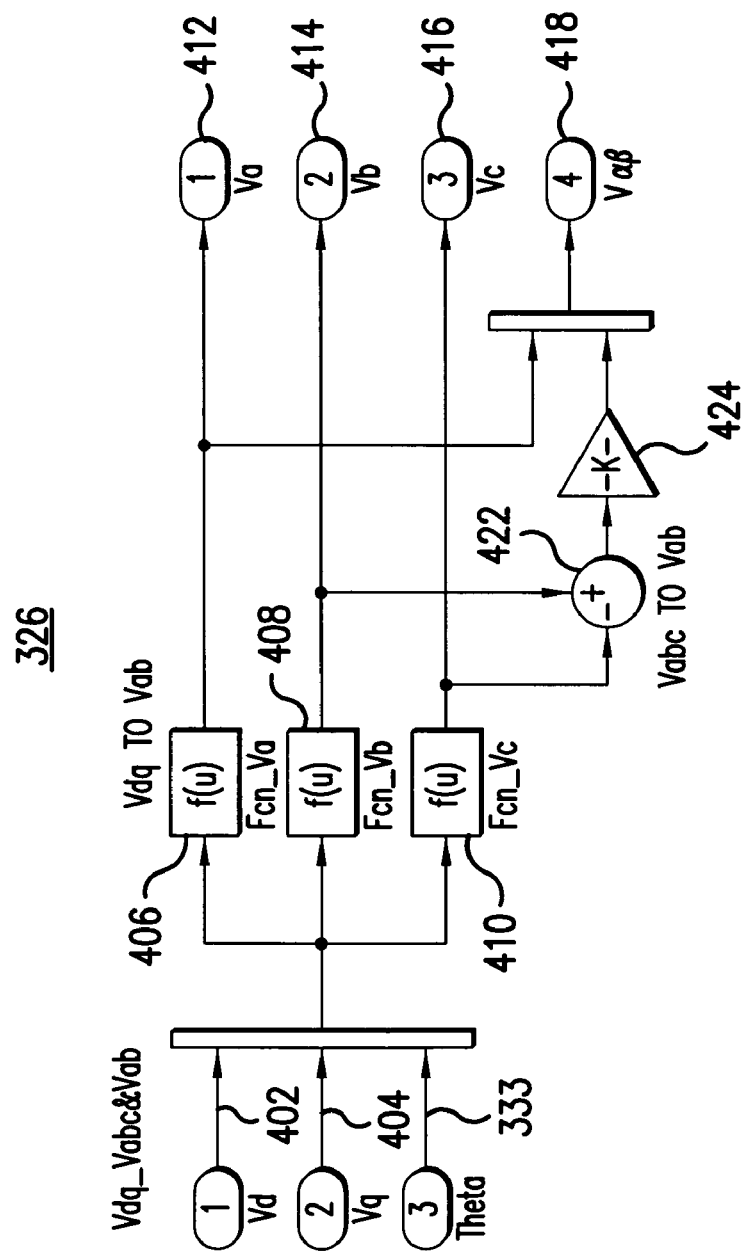
FIG. 4 is a block diagram of frame transformer for a voltage input as shown in FIG. 3.
Figure 5:
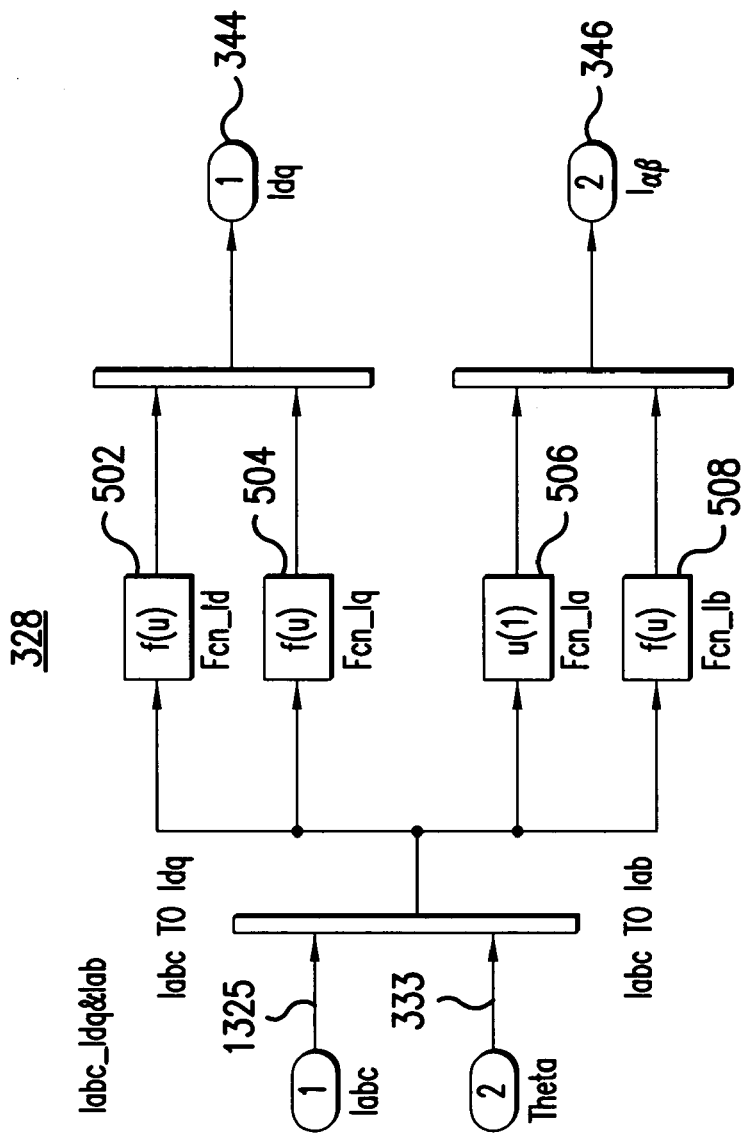
FIG. 5 is a block diagram of frame transformer for a current input as shown in FIG. 3.

FIGS. 4, 5 illustrate the details of the voltage and current frame transformer blocks 326, 328. As shown in FIG. 4, voltage transformer 326 transforms the input voltages in the dq frame into both abc and αβ frames. The input voltages ($V_d$, $V_q$) 402, 404 from current controller 324, using the estimated rotor position (θ) 333 from control block 302 (generated by estimator 330), are transformed by block 326 using function blocks 406, 408, 410, 422, 424 into output voltages in the arbitrary and stationary frames ($V_a$, $V_b$, $V_c$, and $V_{αβ}$) 412, 414, 416, and 418 where $V_{αβ}$ 418 is used as control feedback in the system 300 for EKF 330. Particularly, function blocks 406, 408, 410 may compute the following functions: $V_q*\sin(θ)+V_d*\cos(θ)$ for block 408, $-V_q*\sin(θ-2/3*π)+V_d*\cos(θ-2/3*π)$ for block 408, and $-V_q*\sin(θ+2/3*π)+V_d*\cos(θ+2/3*π)$ for block 410, where θ=Theta and π=pi.

Similarly, as illustrated in FIG. 5, current transformer 328 transforms the three-phase input currents in the stator frame ($I_a$, $I_b$, $I_c$) 1325, using estimated rotor position input 333 (estimated by EKF 330) and function blocks 502, 504, 506, 508, into two output currents ($I_{dq}$, $I_{αβ}$) 344, 346 to be used as control feedback in system model 300. Particularly, function blocks 502, 504, 506, and 508 may compute the following functions: $2/3*(I_a*\cos(θ)+I_b*\cos(θ-2/3*π)+I_c*\cos(θ+2/3*π))$ for block 502, $-2/3*(I_a*\sin(θ)+I_b*\sin(θ-2/3*π)+I_c*\sin(θ+2/3*π))$ for block 504, $I_a$ for block 506, and $\mathrm{sqrt}(3)/3*(I_b-I_c)$ for block 508.

Estimator 330 is derived from frame transformation and motor modeling techniques where equations for estimator 330 include the following:

$$\frac{dI_α}{dt} = -\frac{R_s}{L}I_α + N_P \cdot \frac{λ_r}{L} \cdot ω_r \cdot \sin θ_e + \frac{V_α}{L}, \tag{11}$$

$$\frac{dI_β}{dt} = -\frac{R_s}{L}I_β + N_P \cdot \frac{λ_r}{L} \cdot ω_r \cdot \cos θ_e + \frac{V_β}{L}. \tag{12}$$

where $\frac{dω_r}{dt} = 0.$ \qquad (13)

Further, in matrix form, equations (11), (12), (13) become:

$$\frac{d}{dt}\begin{bmatrix} I_\alpha \\ I_\beta \\ \omega_r \\ \theta_e \end{bmatrix} = \begin{bmatrix} -\frac{R_s}{L} & 0 & N_P\frac{\lambda_r}{L}\sin\theta_e & 0 \\ 0 & -\frac{R_s}{L} & -N_P\frac{\lambda_r}{L}\cos\theta_e & 0 \\ 0 & 0 & 0 & 0 \\ 0 & 0 & N_P & 0 \end{bmatrix} \cdot \begin{bmatrix} I_\alpha \\ I_\beta \\ \omega_r \\ \theta_e \end{bmatrix} + \begin{bmatrix} \frac{1}{L} & 0 \\ 0 & \frac{1}{L} \\ 0 & 0 \\ 0 & 0 \end{bmatrix} \cdot \begin{bmatrix} V_\alpha \\ V_\beta \end{bmatrix}, \quad (14)$$

$$\begin{bmatrix} I_\alpha \\ I_\beta \end{bmatrix} = \begin{bmatrix} 1 & 0 & 0 & 0 \\ 0 & 1 & 0 & 0 \end{bmatrix} \cdot \begin{bmatrix} I_\alpha \\ I_\beta \\ \omega_r \\ \theta_e \end{bmatrix}. \quad (15)$$

where $$\dot{x} = \frac{d}{dt}\begin{bmatrix} I_\alpha \\ I_\beta \\ \omega_r \\ \theta_e \end{bmatrix}; \quad x = \begin{bmatrix} I_\alpha \\ I_\beta \\ \omega_r \\ \theta_e \end{bmatrix}; \quad u = \begin{bmatrix} V_\alpha \\ V_\beta \end{bmatrix}; \quad y = \begin{bmatrix} I_\alpha \\ I_\beta \end{bmatrix};$$

and $$A = \begin{bmatrix} -\frac{R_s}{L} & 0 & N_P\frac{\lambda_r}{L}\sin\theta_e & 0 \\ 0 & -\frac{R_s}{L} & -N_P\frac{\lambda_r}{L}\cos\theta_e & 0 \\ 0 & 0 & 0 & 0 \\ 0 & 0 & N_P & 0 \end{bmatrix}; \quad B = \begin{bmatrix} \frac{1}{L} & 0 \\ 0 & \frac{1}{L} \\ 0 & 0 \\ 0 & 0 \end{bmatrix}; \quad H = \begin{bmatrix} 1 & 0 & 0 & 0 \\ 0 & 1 & 0 & 0 \end{bmatrix},$$

and further, equations (14) and (15) may be written as:

$$\dot{x} = A \cdot x + B \cdot u, \quad (16)$$

$$y = H \cdot x. \quad (17)$$

where the approximate discrete equations of (16) and (17) can be written as $$x_k = (I + A \cdot T) \cdot x_{k-1} + B \cdot T \cdot u_{k-1}, \quad (18)$$

$$y_k = H \cdot x_k. \quad (19)$$

where
I is the unity matrix, and
T is the sample time interval.

In considering the process and measurement noise, equations (18) and (19) may be written as $$x_k = f(x_{k-1}, u_{k-1}, \sigma_{k-1}), \quad (20)$$

$$y_k = h(x_k, \rho_k). \quad (21)$$

where $$f(x_{k-1}, u_{k-1}, \sigma_{k-1}) = (I + A \cdot T)x_{k-1} + B \cdot T \cdot u_{k-1} + \sigma_{k-1}, \quad (22)$$

$$h(x_k, \rho_k) = H \cdot x_k \rho_k. \quad (23)$$

From the previous equations, the states x of motor 308 (e.g., PMSM) may be estimated by estimator 330 through following two steps during each sampling time interval where these steps including the following:

1) Time Update Step:

$$\hat{x}_k^- = f(\hat{x}_{k-1}, u_k, 0), \quad (24)$$

$$P_k^- = C_k P_{k-1} C_k^T + W_k Q_{k-1} W_k^T. \quad (25)$$

2) Measurement Update Step:

$$K_k = P_k^- D_k^T (D_k P_k^- D_k^T + V_k R_k V_k^T)^{-1}, \quad (26)$$

$$\hat{x}_k = \hat{x}_k^- + K_k(y_k - h(\hat{x}_k^-, 0)), \quad (27)$$

$$P_k = (I - K_k D_k) P_k^-. \quad (28)$$

where $$C_{[i,j]} = \frac{\partial f_{[i]}}{\partial x_{[j]}}(\hat{x}_{k-1}, u_k, 0), \quad (29)$$

$$W_{[i,j]} = \frac{\partial f_{[i]}}{\partial \sigma_{[j]}}(\hat{x}_{k-1}, u_k, 0), \quad (30)$$

$$D_{[i,j]} = \frac{\partial h_{[i]}}{\partial x_{[j]}}(\tilde{x}_k, 0), \quad (31)$$

$$V_{[i,j]} = \frac{\partial h_{[i]}}{\partial \rho_{[j]}}(\tilde{x}_k, 0). \quad (32)$$

In matrix form, C and D of equations (25) and (26) become $$C = \begin{bmatrix} 1 - T\frac{R_s}{L} & 0 & T \cdot N_P\frac{\lambda_r}{L}\sin\theta_e & T \cdot \omega_r \cdot N_P\frac{\lambda_r}{L}\cos\theta_e \\ 0 & 1 - T\frac{R_s}{L} & -T \cdot N_P\frac{\lambda_r}{L}\cos\theta_e & T \cdot \omega_r \cdot N_P\frac{\lambda_r}{L}\sin\theta_e \\ 0 & 0 & 1 & 0 \\ 0 & 0 & T \cdot N_P & 1 \end{bmatrix}, \quad (33)$$

$$D = \begin{bmatrix} 1 & 0 & 0 & 0 \\ 0 & 1 & 0 & 0 \end{bmatrix}, \quad (34)$$

where the footnotes k and k−1 are omitted.

Figure 17:
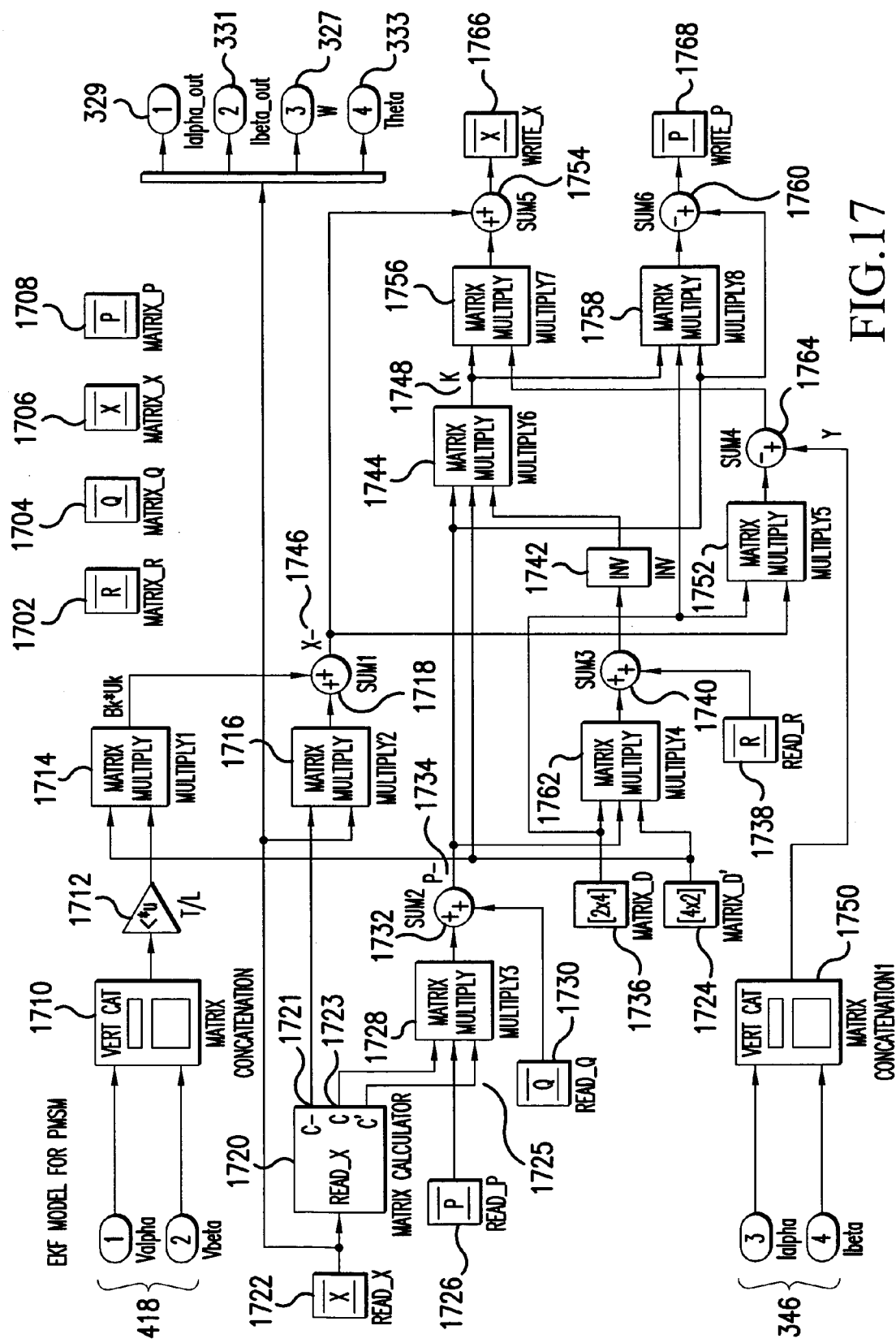
FIG. 17 illustrates an estimator of a sensorless motor control system in accordance with embodiments of the present invention.

From the above mathematical derivation, estimator 330 is produced as shown in FIG. 17. Advantageously, in accordance with the flow process diagram of FIG. 18, for each incremental time period k (e.g., k starting at 0 or 1) estimator (EKF filter) 330 receives as inputs the voltage in the stationary frame 418 ($V_{\alpha\beta}$) output from voltage transformer 326 and the current in the stationary frame 346 ($I_{\alpha\beta}$) output from current transformer 328 to generate output estimates for rotor position (Est_theta) 333, rotor speed (Est_$\omega$) 327, and observer (current) states (Est_$I_\alpha$, Est_$I_\beta$) 329, 331 using the above equations. The estimator 330 further includes block matrices 1702, 1704 that may be noise covariance matrices derived from equations (25), (26), and block matrices 1706, 1708 that may be memory stacks for a time updating step.

During the time update step at step 1802, inputs 418 ($V_{\alpha\beta}$) and function blocks 1710, 1712, 1714, 1716, 1718, 1720, 1722, 1724 are used to compute equation (24). Also, during this time update step 1802, function blocks 1720, 1722, 1726, 1728, 1730, 1732 are used to compute equation (25). Subsequently, in a measurement update step at step 1804, output 1734 (P−) from function block 1732 and function blocks 1724, 1736, 1716, 1738, 1740, 1742, 1744, 1762 are used to compute equation (26). Further, during step 1804, output 1746 (X−) from function block 1718, output 1748 (K) from function block 1744, inputs 346 ($I_{\alpha\beta}$), and function blocks 1736, 1750, 1752, 1754, 1756, 1762 are used to compute equation (27) producing output 1766 (write_X). Also, during step 1804, output 1734 (P−) from function block 1732, output 1748 (K) from function block 1744, and function blocks 1736, 1758, 1760 are used to compute equation (28) producing output 1768 (write_P). Advantageously, to prevent calculation errors, the computations of the present time step may be delayed to the next time step by stacking the outputs of the estimator 330 into the function block 1706 in a current time-step and releasing the outputs through function block 1722 in a subsequent time-step. Further, these output estimates may be compared with the measured parameter values as output by PMSM model 308 and current transformer 328. Particularly, the outputs 1721, 1723, 1725 of the matrix calculator function block 1720 may be computed using the following functions: (I+A*T)*X to compute C− (1721), C*X to compute C (1723), and $C^T$*X to compute C' (1725) in accordance with the above-identified equations.

Figure 18:
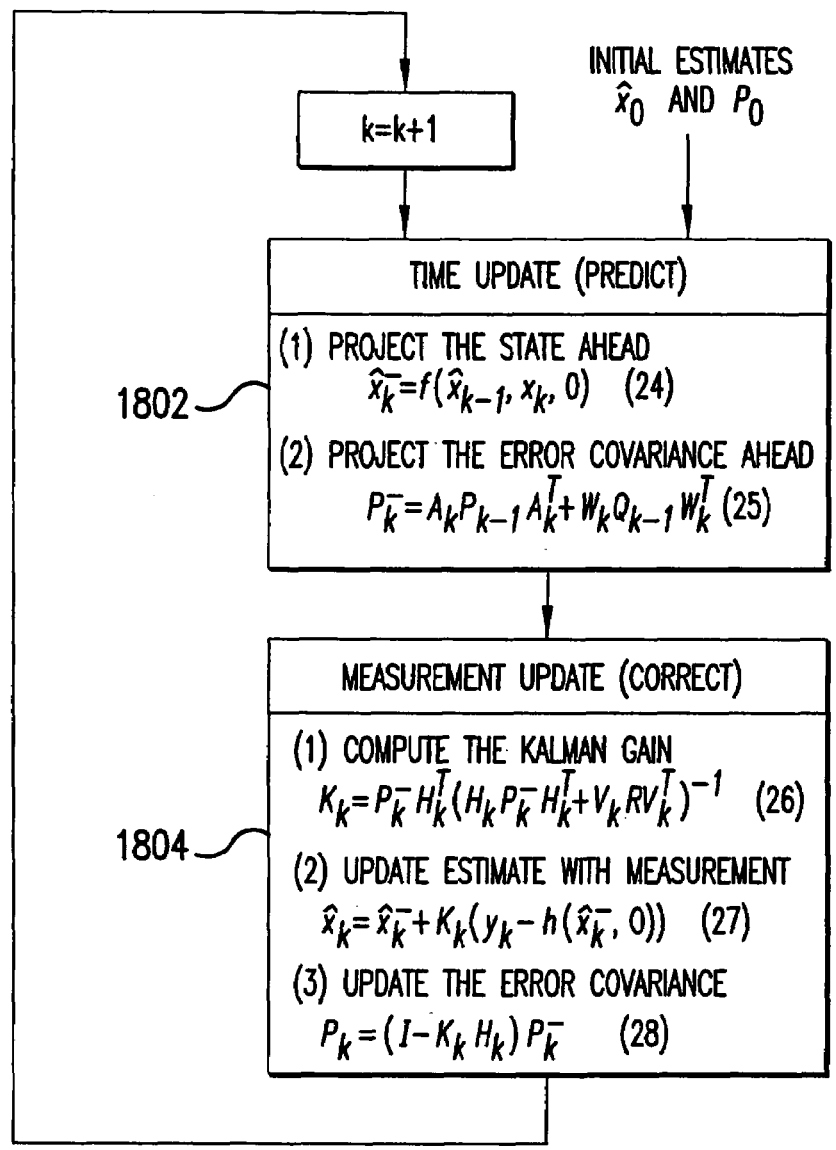
FIG. 18 illustrates a flow process diagram of an estimator of a sensorless motor control system in accordance with embodiments of the present invention.
Figure 19:
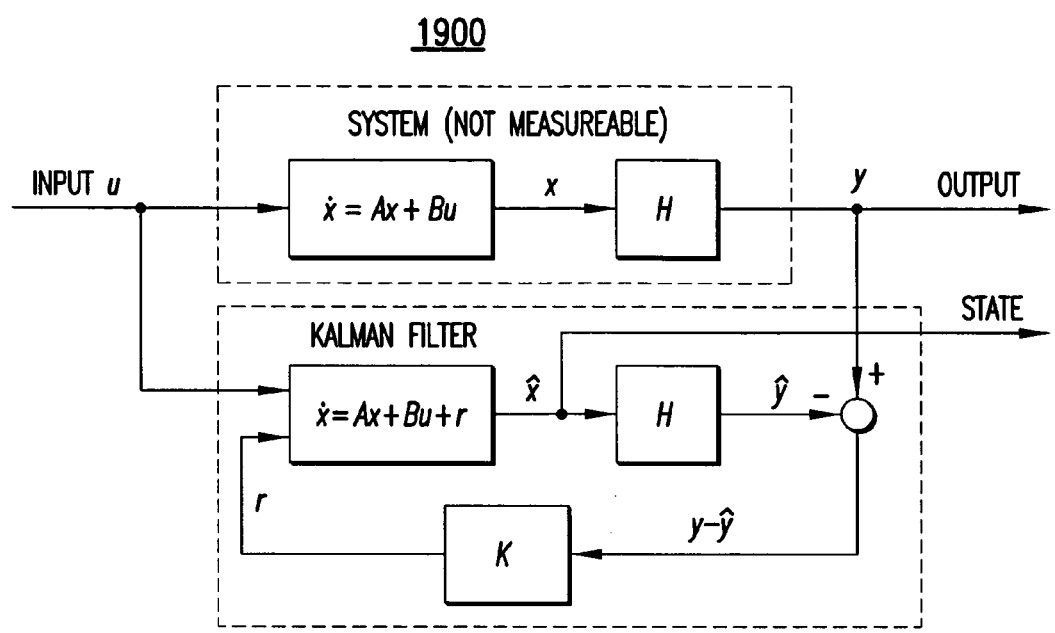
FIG. 19 illustrates an exemplary structure of an estimator of a sensorless motor control system in accordance with embodiments of the present invention.

Advantageously, the estimation process as illustrated in FIG. 18 continues for succeeding time periods (k=k+1) for model system 300 as PMSM model 308 simulates the continuous operation of an actual PMSM to output rotor speed 1312, rotor position 1314, and three-phase current outputs 1325 that are used as control feedback signals to generate estimates for rotor position, rotor speed, and current (observer) states for succeeding time periods. This process is continued for subsequent measurement intervals to update the estimates for the output control vectors (feedback signals—$V_{\alpha\beta}$) 418 and measurement vectors (feedback signals—$I_{\alpha\beta}$) 346.

Although the above equations are particularly derived for a PMSM motor model, the sensorless method described herein using estimator 330 may be equally applied to a plurality of different motor models including PMSM, BLDCM, wound rotor synchronous motor (WRSM), and induction motor (IM). Further, a plurality of embodiments for sensorless control using an EKF as applied to WRSM and PMSM are described herein, and it may be appreciated by those skilled in the art to extend the EKF method for sensorless control to a plurality of other types of machines including IM, BLDCM, and other machines.

Advantageously, three different types of load blocks 310 may be used for system model 300 which include a load torque proportional to the square of the rotor speed 1312, a load torque proportional to the rotor speed 1312, and a constant load torque. Also, advantageously, the model system 300 uses a sinusoidal pulse width modulation power supply (SPWM inverter) 306 to simulate continuous motor operation during actual operation of the system which updates the control vectors in the system during each measurement-sampling interval. SPWM 306 simulates the outputs of a three-phase inverter by converting a DC voltage into a pulse width modulated waveform. Initially, pulse generator 301 generates an enable pulse to trigger control block 302 to produce useful three-phase voltage outputs ($V_a$, $V_b$, $V_c$) from voltage transformer 326 to drive PMSM model 308. The three-phase voltage outputs ($V_a$, $V_b$, $V_c$) are received by SPWM 306 and are compared with the product of a carrier voltage (triangular carrier waveform), produced by a CW (carrier wave) generator, and ⅔ of a DC voltage to produce gating signals for a three-phase inverter to generate three-phase PWM signals, $V_{a\_pwm}$, $V_{b\_pwm}$, $V_{c\_pwm}$ to drive PMSM model 308.

Figure 6:
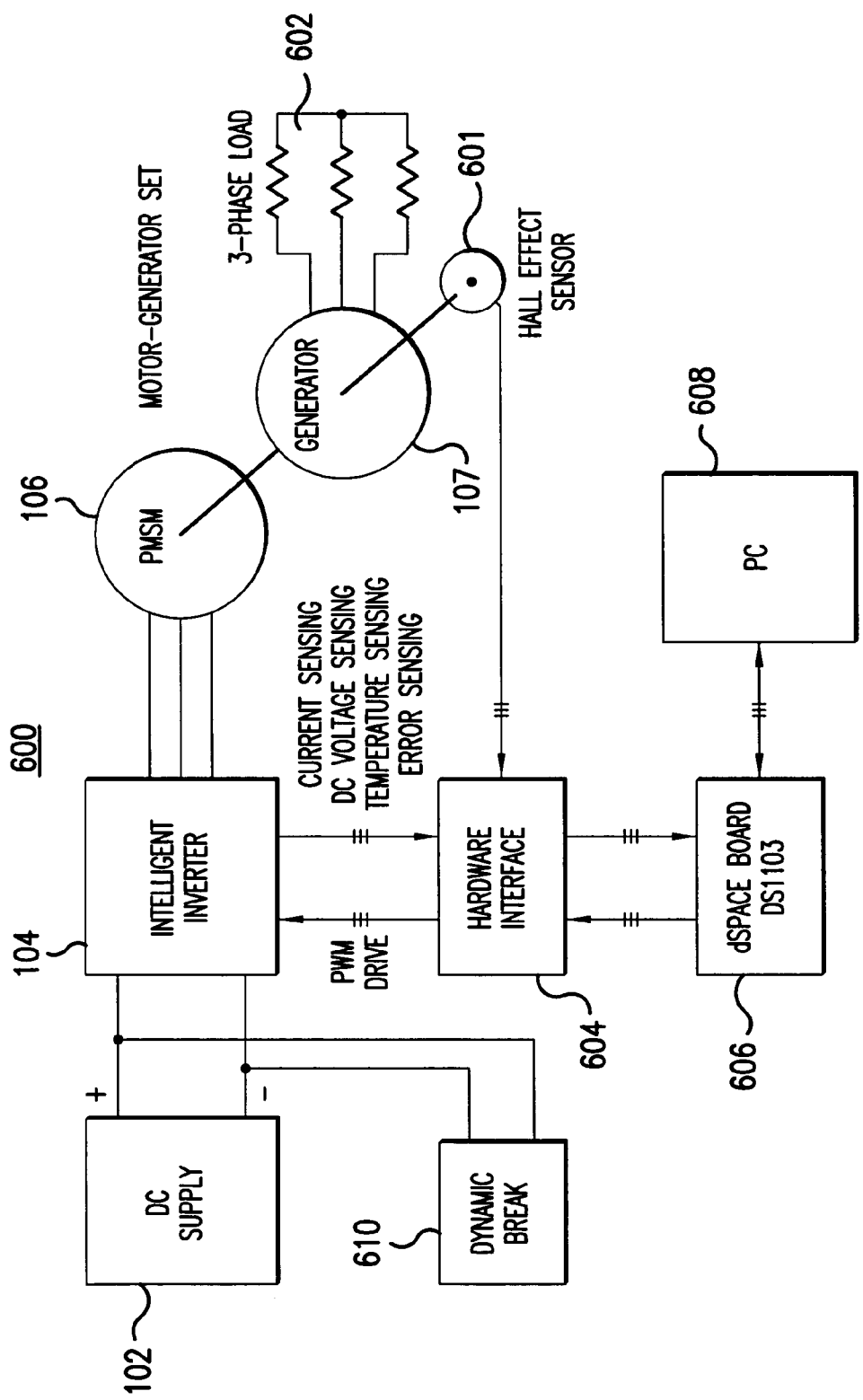
FIG. 6 illustrates a sensorless motor control system with implementation in accordance with embodiments of the present invention.

Advantageously, a sensorless motor drive control system as described herein may be implemented in accordance with the system 600 shown in FIG. 6 where similar elements to FIGS. 1, 2 are identified the same. Sensorless motor drive control system 600 may include DC supply 102, inverter 104, motor 106, generator 107, load 602, hardware interface 604, controller 606, and processor 608. Optionally, the system 600 may include a dynamic break circuit 610 to function as a protection circuit from surge voltages from the inverter 104 by dynamically switching a resistive load into the DC supply—inverter circuit connection when a surge occurs. A voltage surge may occur when kinetic energy of the rotor is converted into electrical energy and fed back into the DC supply in response to the motor 106 being directed to slow down or reverse rotation. Also, system 600 may include a sensor 601 to detect (measure) rotor position and speed for motor 106 especially for testing analysis.

During operation, the DC supply 102 provides DC electrical power to the inverter 104 which converts the DC power into three-phase voltages with variable frequency and amplitude to drive the motor 106 (e.g., PMSM). The generator 107 (e.g., BLDCG) functions as a mechanical load for the motor 106 to provide generated power to a three-phase resistive load 602. Controller 606 is interconnected to inverter 104 via hardware interface 604 and executes instructions input by processor (e.g., computer) 608. Controller 606 includes the relevant control blocks from model system 300 including SPWM 306 and control block 302, which includes speed reference generator 301, speed controller 322, current controller 324, voltage/current transformers 326, 328, and estimator (EKF) 330, to estimate rotor position, rotor speed, current (observer) states for system 600 and provide useful drive signals for the inverter 104 to provide three-phase power to motor 106 as previously described. Further, advantageously, controller 606 may be implemented as a machine-readable medium including instructions to be executed for performing the functions of system 600.

Figure 7:
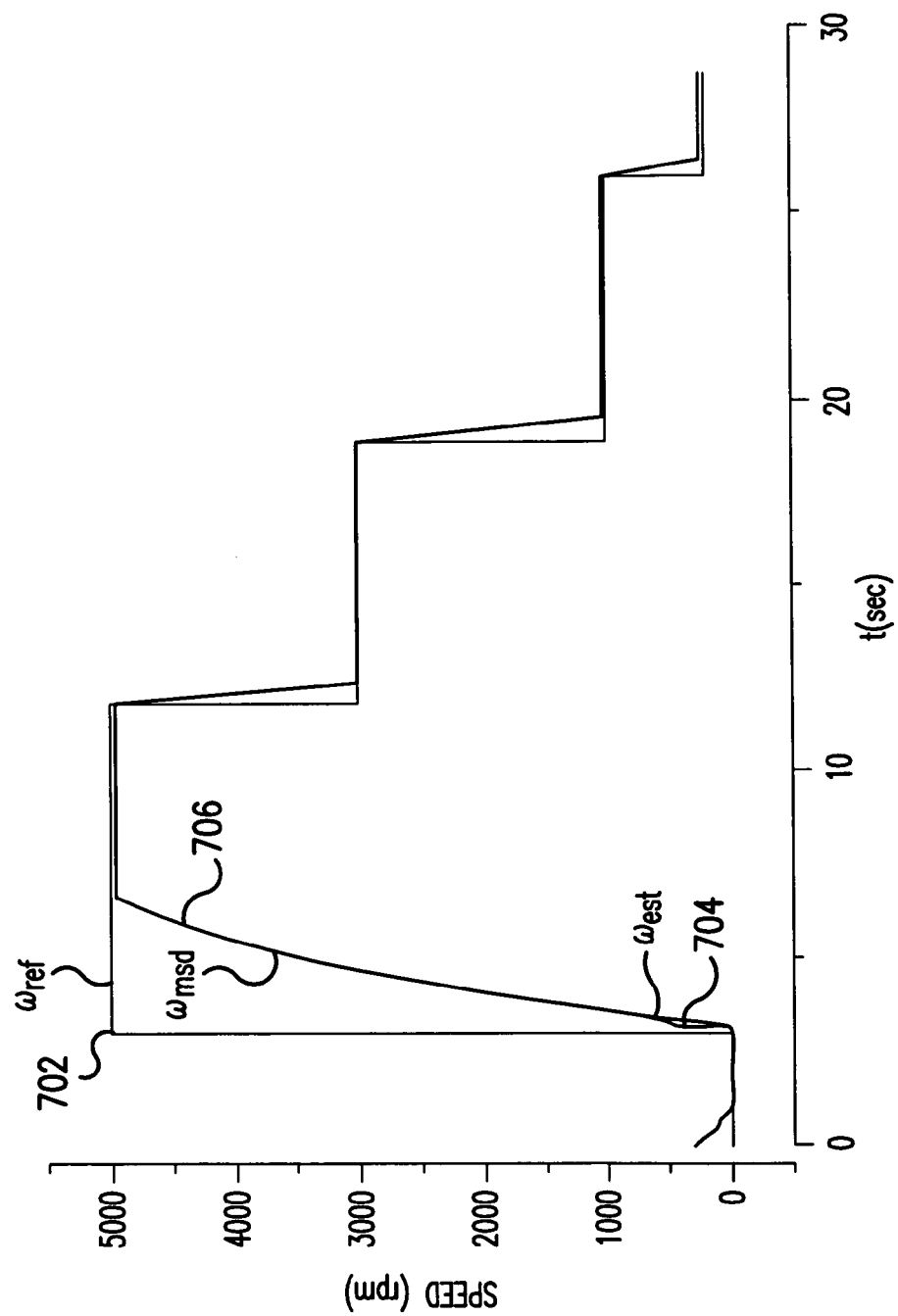
FIGS. 7, 8 are diagrams illustrating performance results of the sensorless motor control system of FIG. 6.
Figure 8:
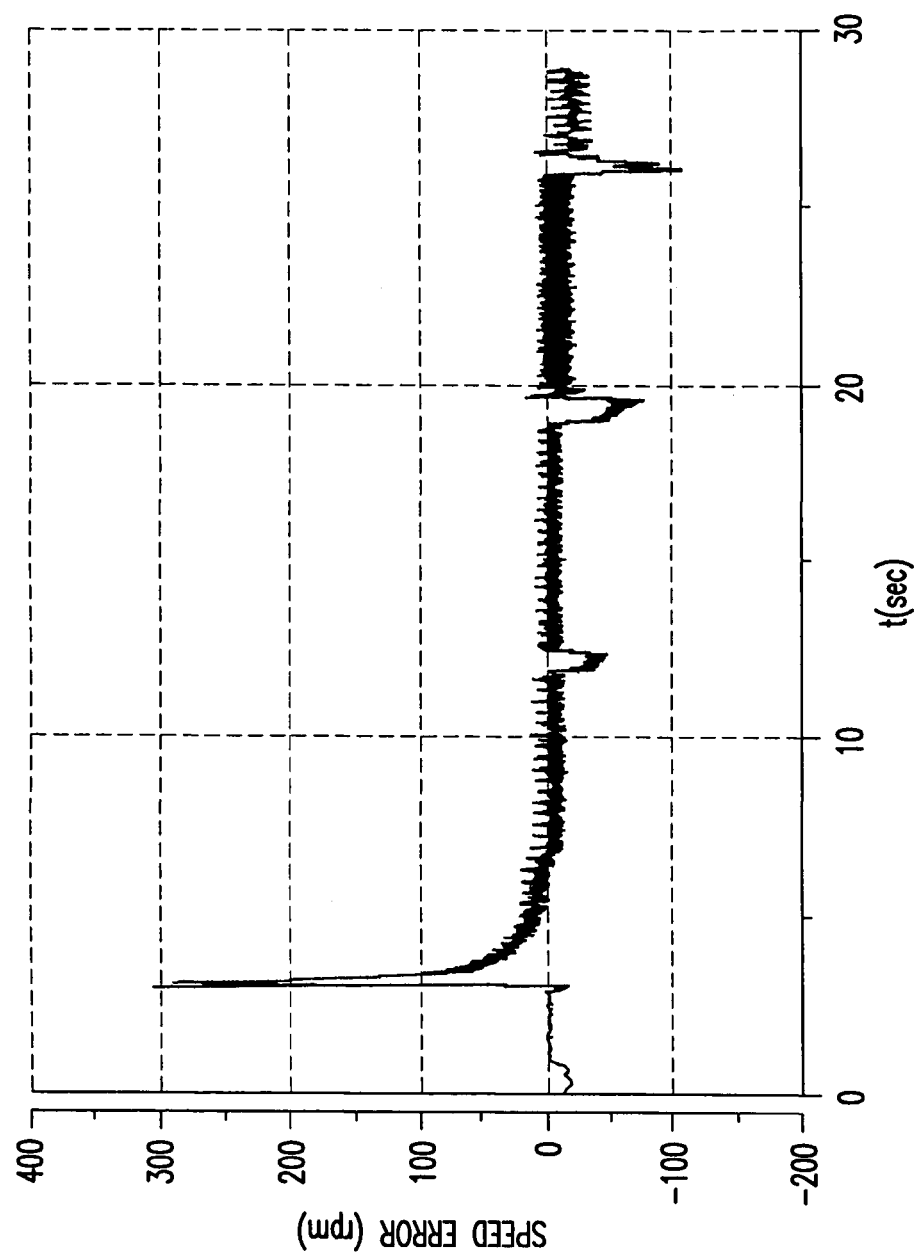

FIGS. 7, 8, 9a, 9b illustrate the performance results of the sensorless motor control system 600 as implemented in FIG. 6. FIG. 7 compares a speed reference 702 ($\omega_{ref}$) used for system 600 and provided by generator 301, with the estimated rotor speed 704 produced by controller 606 ($\omega_{est}$) and the rotor speed 706 ($\omega_{msd}$) measured by sensor 601, and FIG. 8 illustrates the speed error between the measured rotor speed 706 and the estimated rotor speed ($\omega_{msd}-\omega_{est}$). Advantageously, the speed reference 702 may be preset as a step-down waveform to better evaluate steady-state performance of the control system 600. As shown in FIG. 8, the larger errors may occur at transient periods where the rotor speed is being changed.

Figure 9A:
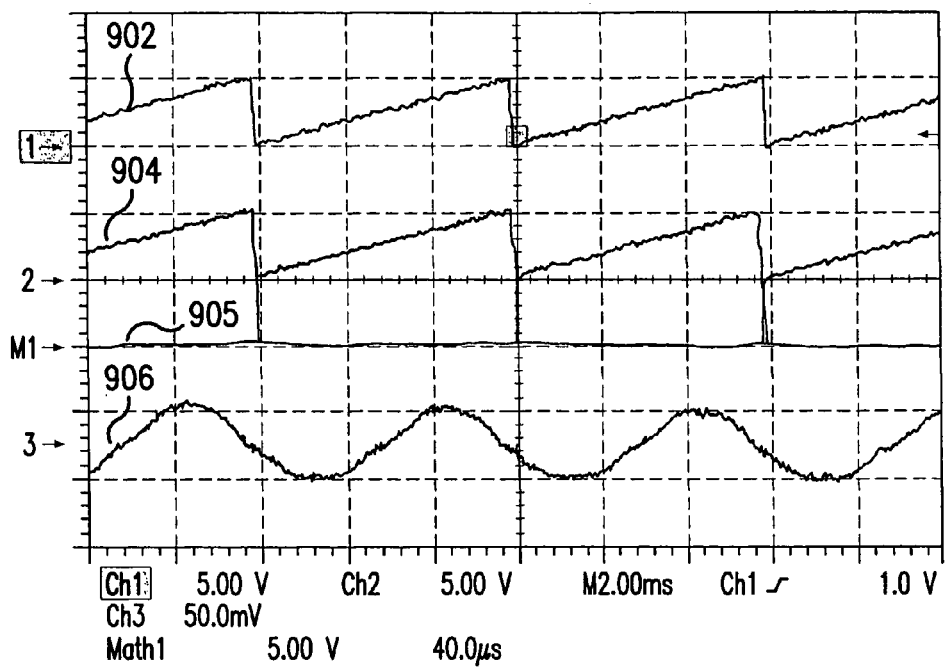
FIGS. 9a, 9b are additional diagrams illustrating performance results of the sensorless motor control system of FIG. 6.
Figure 9B:
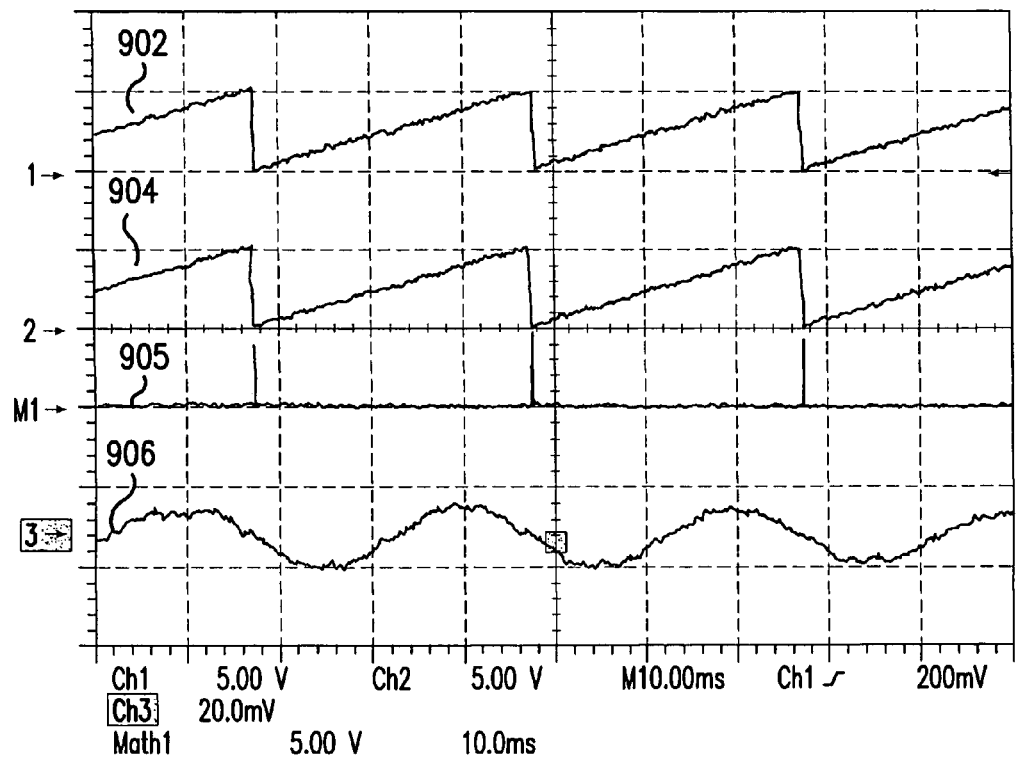

FIGS. 9a, 9b show the performance results for system 600 comparing the measured rotor position 902 ($\theta_{msd}$) by sensor 601, estimated rotor position 904 ($\theta_{est}$) estimated by controller 606, rotor position error 905 ($\theta_{msd}-\theta_{est}$), and the stator phase-current 906 output by motor 106 during the relevant testing period. FIGS. 9a, 9b illustrate the results for rotor speed at 5000 rpm and 1000 rpm, respectively, where the average steady-state position error is decreased for both 5000 rpm and 1000 rpm showing accurate position estimation for system 600.

Figure 16A:
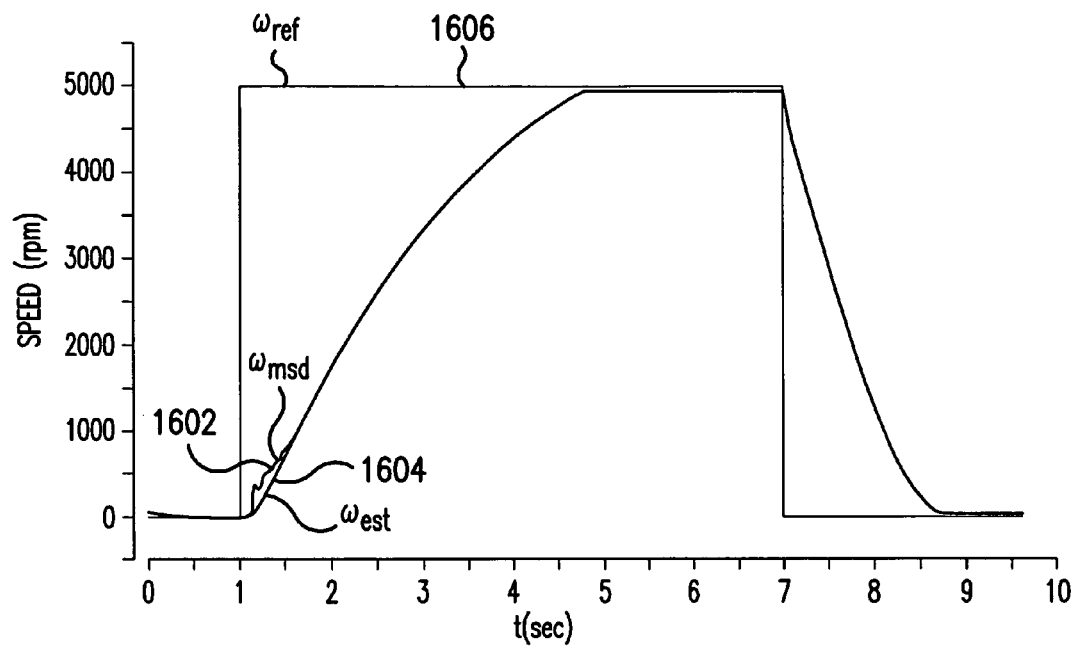
FIGS. 16a, 16b, 16c are diagrams illustrating startup performance results of the sensorless motor control system of FIG. 6.
Figure 16B:
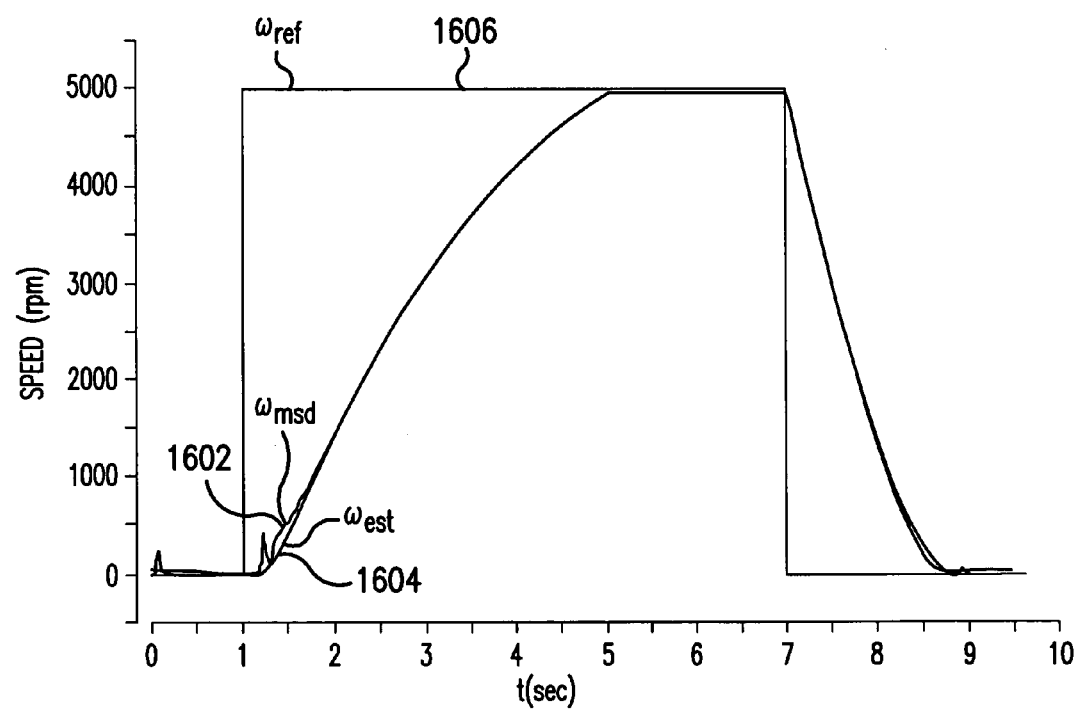
Figure 16C:
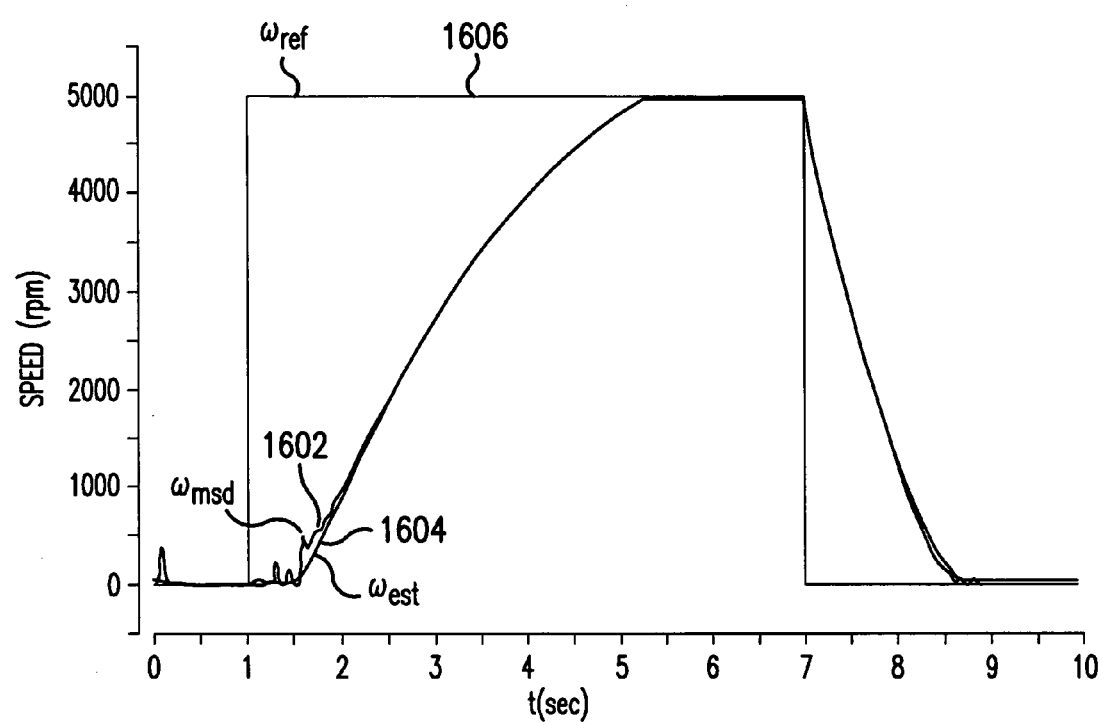

Advantageously, system 600 may be operated using a plurality of preset, initial rotor positions especially to test the startup transient (from standstill) performance of the system. These preset positions may include 0, 30, 60, 90, 120, 150, 180, 210, 240, 270, 300, and 330 degrees. FIGS. 16a, 16b, 16c illustrate the startup transient performance of system 600 by comparing the measured rotor speed 1602 ($\omega_{msd}$) with the estimated rotor speed 1604 ($\omega_{est}$) at preset, initial rotor positions of 0, 90, and 180 degrees, respectively. A speed reference 1606 ($\omega_{ref}$) may provide a step command to start the motor at a predetermined time (e.g., 1.0 seconds) from standstill. As shown in these figures, the estimated rotor speed 1604 converges rapidly to the measured rotor speed 1602 for a variety of initial starting positions. Advantageously, this fast convergence for multiple starting positions eliminates the need for current pulse injection and divergence corrects which add to the complexity of system 600.

Although a three-phase load 602 is shown for system 600, it is noted that a plurality of different load conditions may be used to provide the sensorless EKF method described herein. In accordance with embodiments of the present invention, the EKF sensorless method may be implemented, as illustrated in FIG. 6, to provide accurate steady state/dynamic rotor position and speed information leading to proper operation of the controlled motor-drive system 600 from standstill to full speed and under a plurality of operating loading conditions.

The present invention provides a plurality of advantages including a robust and universal control method for a variety of sensorless motor controls including wound rotor synchronous motors (WRSM), brushless DC motors (BLDC), permanent magnet synchronous motors (PMSM), and induction motors (IM). Other advantages include improved steady state and dynamic performance for a variety of motor system operating conditions including from standstill to full rated speed with or without a rated torque load. Further advantages include proper control system operation for initial start-up, standstill at full torque, speed reversal, and power interruption. Also, the sensorless model described here may be insensitive to machine/system parameter variations, compatible with advanced control strategies/gating patterns (SPWM and SVM) with optimized power quality (PQ) and minimum electromagnetic interference (EMI). Further, the method described herein may provide lower sampling rates and switching frequencies resulting in reduced DSP throughput and reduced thermal management requirements and provide optimal filtering of noise when performing measurements in the system.

Although the invention is primarily described herein using particular embodiments, it will be appreciated by those skilled in the art that modifications and changes may be made without departing from the spirit and scope of the present invention. As such, the method disclosed herein is not limited to what has been particularly shown and described herein, but rather the scope of the present invention is defined only by the appended claims.

What is claimed is:

1. An apparatus for speed and position sensorless control of a motor-drive system, comprising:
    an estimator for generating estimates for rotor position and speed for a time-varying and non-linear motor, said estimator applying an Extended Kalman Filter that models motor operating conditions to estimate both rotor position and speed, said Extended Kalman Filter enabling said estimator to estimate rotor position and speed during motor start up for various initial rotor positions in absence of an injected current pulse, said Extended Kalman Filter automatically correcting divergence of estimated rotor position and speed during start up; and
    a controller for generating motor drive control signals in response to rotor position and speed estimates generated by said estimator,
    wherein said estimator directly estimates rotor speed from Extended Kalman Filter calculations without relying on a time derivative from estimated position.

2. The apparatus of claim 1, wherein said motor drive control signals are direct-axis (d-axis) and quadrature-axis (q-axis) reference voltages, said apparatus further comprising:
    a frame transformer for transforming said d-axis and q-axis reference voltages into multi-phase voltage reference values.

3. The apparatus of claim 2, further comprising:
    a pulse width modulation (PWM) generator for generating PWM signals based on said multi-phase voltage reference values; and
    an inverter to provide conditioned power based on said PWM signals to drive said motor.

4. The apparatus of claim 1, wherein said motor is a permanent magnet synchronous motor, a wound rotor synchronous motor, an induction motor, or a brushless DC motor.

5. The apparatus of claim 1, wherein said controller includes a speed controller and a current controller.

6. The apparatus according to claim 1, wherein said estimator applies said Extended Kalman Filter to estimate rotor position and speed over the entire speed range of said motor and during variable load conditions.

7. A method for controlling a motor-drive system, comprising:
    generating estimates for rotor position and speed for a time-varying and non-linear motor, said step of generating estimates applying an Extended Kalman Filter that models motor operating conditions to estimate both rotor position and speed, said Extended Kalman Filter enabling said step of generating estimates to accurately estimate rotor position and speed during motor start up for various initial rotor positions in absence of an injected current pulse, said Extended Kalman Filter automatically correcting divergence of estimated rotor position and speed during start up; and
    generating motor drive control signals in response to rotor position and speed estimates generated by said step of generating estimates, wherein said step of generating directly estimates rotor speed from Extended Kalman Filter calculations without relying on a time derivative from estimated position.

8. The method of claim 7, wherein said motor drive control signals are direct-axis (d-axis) and quadrature-axis (q-axis) reference voltages, said method further comprising:
frame transforming said d-axis and q-axis reference voltages to multi-phase voltage reference values.

9. The method of claim 7, wherein said motor is a permanent magnet synchronous motor, a wound rotor synchronous motor, an induction motor, or a brushless DC motor.

10. The method according to claim 8, further comprising:
generating pulse width modulation (PWM) signals based on said multi-phase voltage reference values; and
conditioning DC supply power based on said PWM signals to generate multi-phase AC power supplied to said motor.

11. A machine-readable medium having stored thereon a plurality of executable instructions, the plurality of instructions comprising instructions to:
generate estimates for rotor position and speed for a time-varying and non-linear motor, said step of generating estimates applying an Extended Kalman Filter that models motor operating conditions to estimate both rotor position and speed, said Extended Kalman Filter enabling said step of generating estimates to accurately estimate rotor position and speed during motor start up for various initial rotor positions in absence of an injected current pulse, said Extended Kalman Filter automatically correcting divergence of estimated rotor position and speed during start up; and
generate motor drive control signals in response to rotor position and speed estimates generated by said step of generating estimates,
wherein said step of generating directly estimates rotor speed from Extended Kalman Filter calculations without relying on a time derivative from estimated position.

12. The medium of claim 11, wherein said motor drive control signals are direct-axis (d-axis) and quadrature-axis (q-axis) reference voltages, said method further comprising instructions to:
frame transform said d-axis and q-axis reference voltages to multi-phase voltage reference values.

13. The medium of claim 11, wherein said a motor is a permanent magnet synchronous motor, a wound rotor synchronous motor, an induction motor, or a brushless DC motor.

14. The medium according to claim 12, further comprising instructions to:
generate pulse width modulation (PWM) signals based on said multi-phase voltage reference values; and
condition DC supply power based on said PWM signals to generate multi-phase AC power supplied to said motor.

* * * * *